United States Patent

Sakagawa et al.

Patent Number: 5,287,535
Date of Patent: Feb. 15, 1994

[54] SWITCHING NODE IN LABEL MULTIPLEXING TYPE SWITCHING NETWORK

[75] Inventors: Kazuo Sakagawa; Teruhisa Nakamura; Ichiro Iida, all of Kawasaki, Japan

[73] Assignee: Fujitsu Limited, Kanagawa, Japan

[21] Appl. No.: 880,066

[22] Filed: May 7, 1992

[30] Foreign Application Priority Data

May 7, 1991 [JP] Japan ................................. 3-101550
Sep. 19, 1991 [JP] Japan ................................. 3-240013

[51] Int. Cl.⁵ .......................................... H04Q 11/04
[52] U.S. Cl. ...................................... 370/60; 370/60.1
[58] Field of Search ............... 370/60, 94.1, 53, 94.2, 370/58.1, 58.2, 58.3, 60.1

[56] References Cited

U.S. PATENT DOCUMENTS

| | | | |
|---|---|---|---|
| 4,864,560 | 9/1989 | Quinquis et al. | 370/60 |
| 4,920,531 | 4/1990 | Isono et al. | 370/60 |
| 4,964,119 | 10/1990 | Endo et al. | 370/60 |
| 5,079,762 | 1/1992 | Tanabe | 370/60 |
| 5,144,297 | 9/1992 | Ohara | 370/60 |

Primary Examiner—Douglas W. Olms
Assistant Examiner—Ajit Patel
Attorney, Agent, or Firm—Staas & Halsey

[57] ABSTRACT

A switching node in a label multiplexing type switching network includes a switch for selectively coupling input logical communications paths and output logical communications paths with each other, m permanent logical communications paths being included in the input logical communications paths where m is an integer larger than or equal to 1, n permanent logical communications paths being included in the output logical communications paths where n is an integer larger than or equal to 1. The switch node includes a call control unit for receiving connection-oriented type information through any of the input logical communications paths and for controlling the switch so that the connection-oriented type information are selectively transferred to the output logical communications paths via the switch on the basis of routing address information related to the connection-oriented type information. The switch node comprises a routing unit for receiving connectionless type information through any of the m logical communications paths and for controlling the switch so that the connectionless type information are selectively transferred to the n permanent logical communications paths via the switch on the basis of routing address information related to the connectionless type information.

21 Claims, 21 Drawing Sheets

FIG. 13

| ROUTING ADDRESS | OUTPUT PORT ADDRESS |
|---|---|
| . . . . | . . . . |

(a) (ST=BOM, SSM)

| MID | OUTPUT PORT ADDRESS |
|---|---|
| . . . . | . . . . |

(b) (ST=COM, EOM)

SWITCHING NODE IN LABEL MULTIPLEXING TYPE SWITCHING NETWORK

BACKGROUND OF THE INVENTION

1. Field of the Invention

The present invention generally relates to label multiplexing type switching networks, such as an ATM (Asynchronous Transfer Mode) switching network and a frame relay switching network. More specifically, the present invention is concerned with a switching node capable of forming integrated communications systems in the label multiplexing type switching networks.

2. Description of the Related Art

Recently, there has been considerable activity in the development of label multiplexing type switching networks capable of equally handling a variety of data, such as audio data, dynamic image data and high-speed data. Examples of these label multiplexing type networks are ATM switching networks and frame relay switching networks. In these switching networks, label type (packet type) data is multiplexed with information to be transferred through a user-network interface (UNI) or a network-node interface (NNI). An identifier for communication identification is added to a header of each packet. As is well known, the user-network interface couples terminal equipment (TE) and switching nodes with each other, and the network-node interface couples the switching nodes with each other.

FIG. 1 shows a conventional label multiplexing type network. In order to efficiently transfer information, a plurality of virtual channels (VC; also called virtual circuits) are defined on a single physical line (UNI or NNI). In this manner, multiplexed transmission is realized.

A predetermined virtual channel VC (which is depicted by a thick solid line in FIG. 1) is a permanent virtual channel (PVC) for signaling. The permanent virtual channel is also called a permanent virtual circuit. In the network, in advance of actual call communications, call control information is exchanged between the terminal equipment and the switching nodes or between the switching nodes, using the signaling channel. A call control processor in each switching node executes a call control process based on the call control information. By this call control process, a logical communications path having a fixed route is established between the terminals TE, and hence messages can be transferred between them. Thereafter, a label exchange switch in each of the switching nodes makes a connection between the virtual channels on the UNI or NNI. In this state, terminal-to-terminal communications can be performed. After the end of the communications, the call control processor in each of the switching nodes releases the logical communications path being used.

Communications services having a call control process as described above are called connection-oriented type (CO type) communications services, and a basic communications protocol in the label multiplexing type network, such as ATM networks and frame relay networks.

In integrated services networks as described above, there is an increasing demand for communications services other than normal communications services. In such additional or secondary communications services, it is required that information be transferred at high speed (or in real time) in a single message format. Examples of these secondary communications services are telemetering that gathers information from remote terminals, a computer network system connected between local area networks, and a transaction process in which an updating process of a database is executed, such as a seat reservation system or a banking system.

If the above-mentioned secondary communications services are provided by means of the label multiplexing type switching network, the following first and second method would be possible. The first method is such that the secondary communications services are provided as the connection-oriented type communications services. That is, call setup and call releasing processes are carried out for each single message which generates the communications request. The second method is to provide a permanent virtual channel PVC for each terminal TE which may utilize single-message communications. Each single-message is transferred through the above permanent virtual channel PVC.

However, the first and second methods have the following respective disadvantages. It is required that the call connection process should be performed at high speed in view of the performance of the communications services for telemetering and the transaction process. However, the first method must execute the call setup process and the call releasing process for each single-message. These processes are a large load of the call control process, and considerably degrades the ability of the call control process.

The second method does not need to execute the call setup process and the call releasing process for each single-message. However, the permanent virtual channel PVC is always occupied by the specific terminal equipment, and the resources of the network (channel resources) cannot be efficiently utilized.

A description will now be given of the disadvantages of the switching networks themselves based on the connection-oriented communications services, separately from the above-mentioned disadvantages encountered when the secondary communications services, such as the telemetering process and the transaction process, are provided by the label multiplexing networks.

In the general switching networks capable of providing the connection-oriented communications services, the call control process is carried out in such a manner that when a correction-oriented call is accepted, the terminal equipment is given a maximum band available at this time in order to ensure the quality of communications even if heavy traffic comes from the terminal equipment. However, as shown by hatched areas in (a) of FIG. 2, a large idle band will occur for each virtual call VC. Hence, the band cannot be efficiently utilized.

On the other hand, in the recently developed label multiplexing type switching networks based on the connection-oriented communications services, the information transfer route is fixed during communications. Thus, it is easy to identify the traffic performance of each virtual call in communications and hence to realize quantitative traffic control of the whole network. In addition, communication information can be placed in an idle time slot per cell (frame or packet), and hence any idle time in traffic in each of the virtual calls VC in each link (interface) can be efficiently used. Hence, it becomes possible to realize statistically efficient multiplexing of a plurality of virtual calls.

However, in general, the above statistically effective multiplexing will be expected only when calls having similar traffic characteristics are multiplexed in a large number of channels. Particularly, if traffic having a characteristic similar to that of a burst occurs, other traffic will greatly be affected. As a result, a large delay in transmission of information takes place, and the cell loss probability will increase. With the above in mind, the label multiplexing network is forced to handle a regulated number of virtual calls. Hence, as shown in (b) of FIG. 2, an idle band depicted by a hatched area will be generated in each link (interface), and the resources of the network cannot be efficiently utilized.

As described above, the conventional label multiplexing networks providing the connection-oriented communications services cannot effectively provide the secondary communications services, such as the telemetering and the transaction processing. On the other hand, the resources of the network cannot be effectively utilized if the label multiplexing type networks are designed to provide only the connection-oriented communications services.

SUMMARY OF THE INVENTION

It is a general object of the present invention to provide a switching node in a label multiplexing type switching network in which the above disadvantages are eliminated.

A more specific object of the present invention is to make it possible to efficiently provide the secondary communications services as connectionless type communications services in the label multiplexing type switching network.

Another object of the present invention is to fill traffic-idle areas with connectionless type communications traffic and hence to efficiently use the network resources.

The above objects of the present invention are achieved by a switching node in a label multiplexing type switching network, the switching node comprising:

switch means for selectively coupling input logical communications paths and output logical communications paths with each other, m permanent logical communications paths being included in the input logical communications paths where m is an integer larger than or equal to 1, n permanent logical communications paths being included in the output logical communications paths where n is an integer larger than or equal to 1;

call control means, coupled to the switching means, for receiving connection-oriented type information through any of the input logical communications paths and for controlling the switch means so that the connection-oriented type information are selectively transferred to the output logical communications paths via the switch means on the basis of routing address information related to the connection-oriented type information; and routing means, coupled to the switch means, for receiving connectionless type information through any of the m logical communications paths and for controlling the switch means so that the connectionless type information are selectively transferred to the n permanent logical communications paths via the switch means on the basis of routing address information related to the connectionless type information.

BRIEF DESCRIPTION OF THE DRAWINGS

Other objects, features and advantages of the present invention will become more apparent from the following detailed description when read in conjunction with the accompanying drawings, in FIG. 1 is a block diagram of a conventional virtual channel connection using a fixed route;

FIG. 13 is a diagram showing the contents of an output route selection table;

DESCRIPTION OF THE PREFERRED EMBODIMENTS of

To facilitate better understanding of the present invention, a description will now be given of conventional ATM networks capable of providing connectionless type communications services.

In the connectionless type communications services, the communications environment is agreed before the starting of the actual call communications, and data including data concerning the communications environment is transferred by a single complete operation. In order to provide the secondary communications services in the ATM networks, such as the telemetering and the transaction processing, by means of the connectionless type communications services, it is necessary to control congestion without decreasing throughput.

Figure 3:
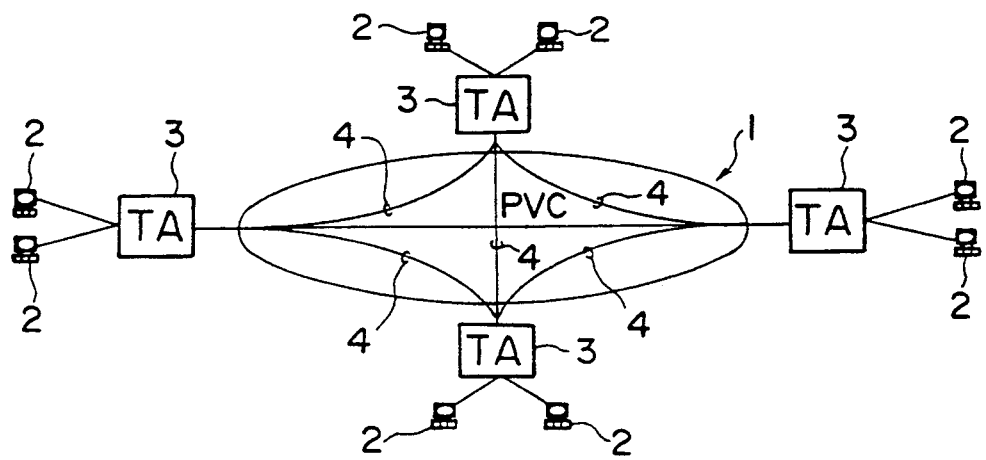
FIG. 3 is a block diagram of a conventional ATM switching network providing connectionless type communications services.

FIG. 3 is a block diagram of a conventional ATM switching network that provides the connectionless type communications services. A terminal adapter (TA) 3 is interposed between an ATM switching network 1 and each connectionless (CL) terminal 2. Each terminal adapter 3 terminates the related connectionless terminals 2. Permanent virtual circuits (PVC) 4 are provided between the terminal adapters 3. In this case, the ATM network 1 provides transparent paths.

Figure 4:
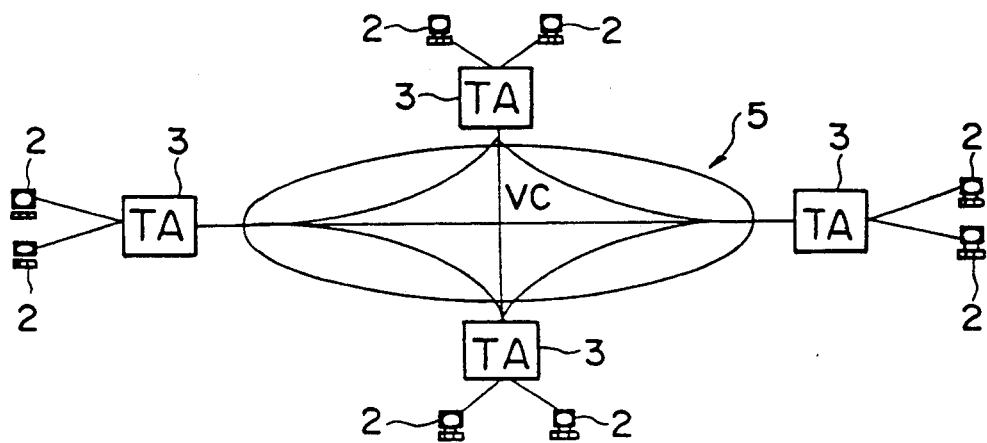
FIG. 4 is a block diagram of another conventional ATM switching network providing connectionless type communications services.

FIG. 4 is a block diagram of another conventional ATM switching network that provides the connectionless type communications services. In FIG. 4, those parts which are the same as those shown in FIG. 3 are given the same reference numerals. Each terminal adapter 3 outputs a call setup request to an ATM network 5 in response to receipt of each message from the connectionless terminals 2. In response to receipt of the call setup request, the ATM network 5 sets up a virtual channel for each message, and releases it for each message.

Figure 5:
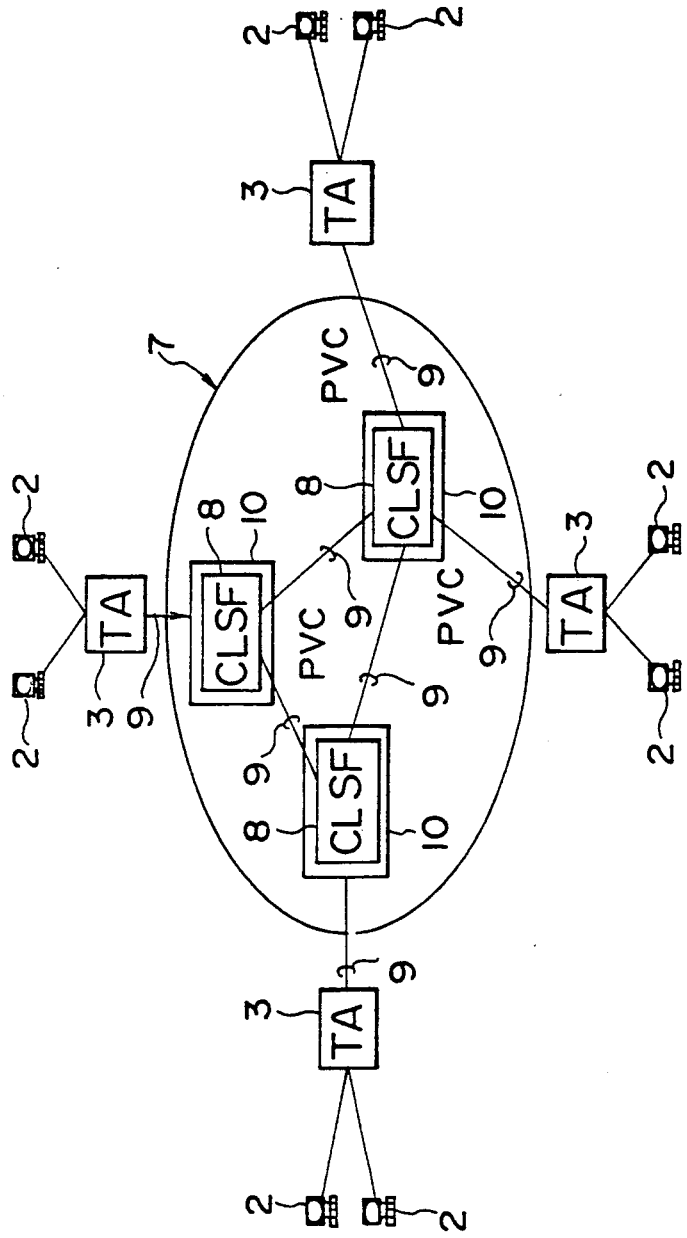
FIG. 5 is a block diagram of yet another conventional ATM switching network providing connectionless type communications services.

FIG. 5 is a block diagram of yet another conventional ATM switching network that provides the connectionless type communications services. In FIG. 5, those parts which are the same as those shown in FIG. 3 are given the same reference numerals. Referring to FIG. 5, connectionless services function units (hereinafter simply referred to as CLSF units) 8, which terminate the protocol of the connectionless terminals 2, are provided in an ATM switching network 7. The CLSF units 8 and the terminal adapters 3 are connected by permanent virtual channels PVC. The CLSF units 8 are respectively connected to exchanges 10.

The CLSF units 8 refer to routing information contained in a message received from the connectionless terminals 2 through the terminal adapters 3, and transfer cells to destination terminals through the permanent virtual channels PVC. Although not shown in FIG. 5, the ATM network 7 may have an exchange that does not have the CLSF unit 8.

Figure 6:
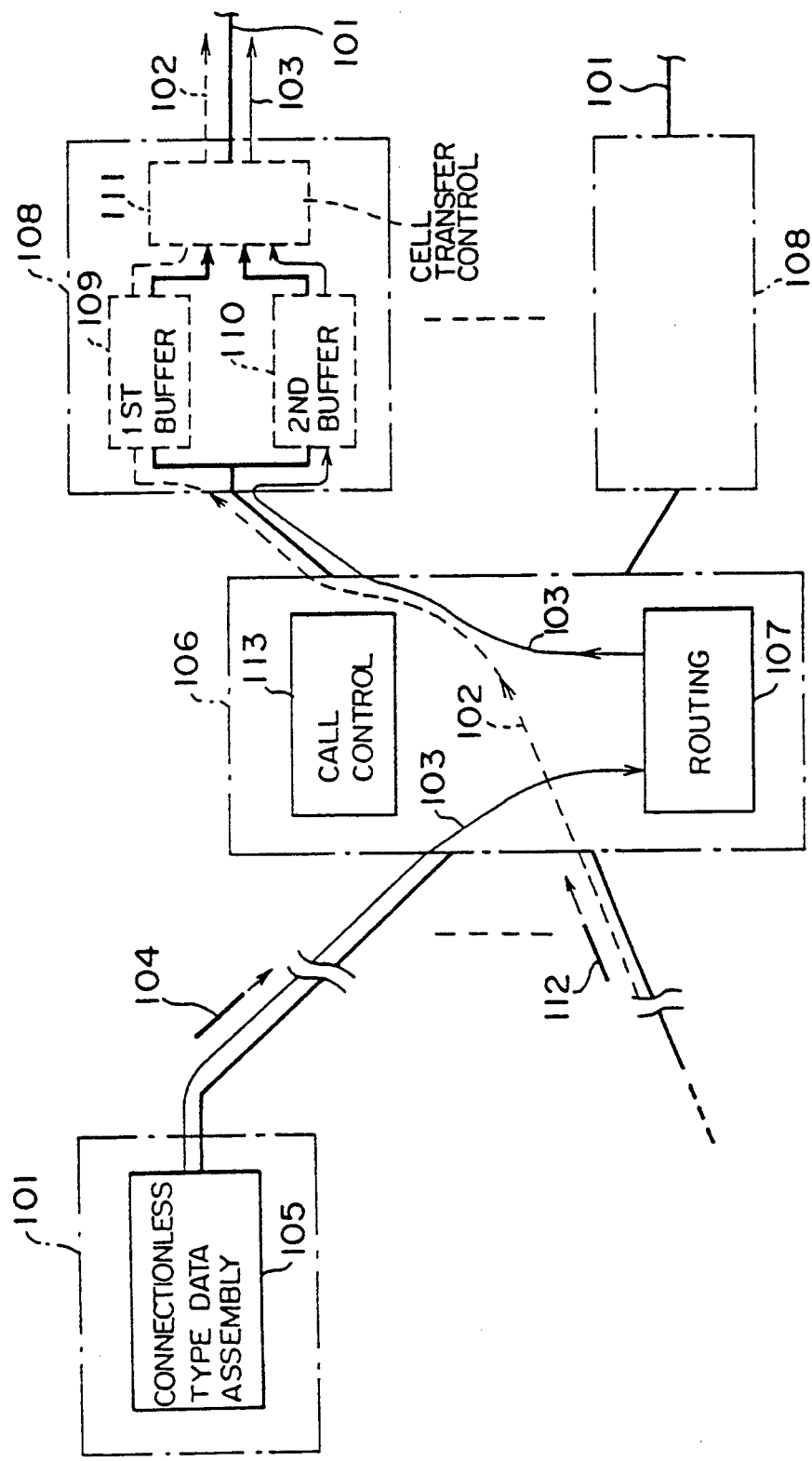
FIG. 6 is a block diagram of an overview of a first embodiment of the present invention.

FIG. 6 is a block diagram of a first embodiment of the present invention. The first embodiment is concerned with a label multiplexing type switching network in which a connectionless type communications system is integrated with a connection-oriented communications system. In the connection-oriented type communications system, information is transferred between terminals using logical communications paths in which a route is established per call control. In the connectionless type communications system, information is transferred without any call control process. The label multiplexing type network is, for example, an ATM switching network in which data transfer per transfer routine is executed by multiplexing fixed-length cells which are label type data with each other. The logical communications paths in this case are virtual channels (VC: also referred to as virtual circuits). The virtual channels VC are respectively identified by a virtual path identifier (VPI) or a virtual channel identifier (VCI), VPI and VCI being added to the header of each cell.

Figure 7:
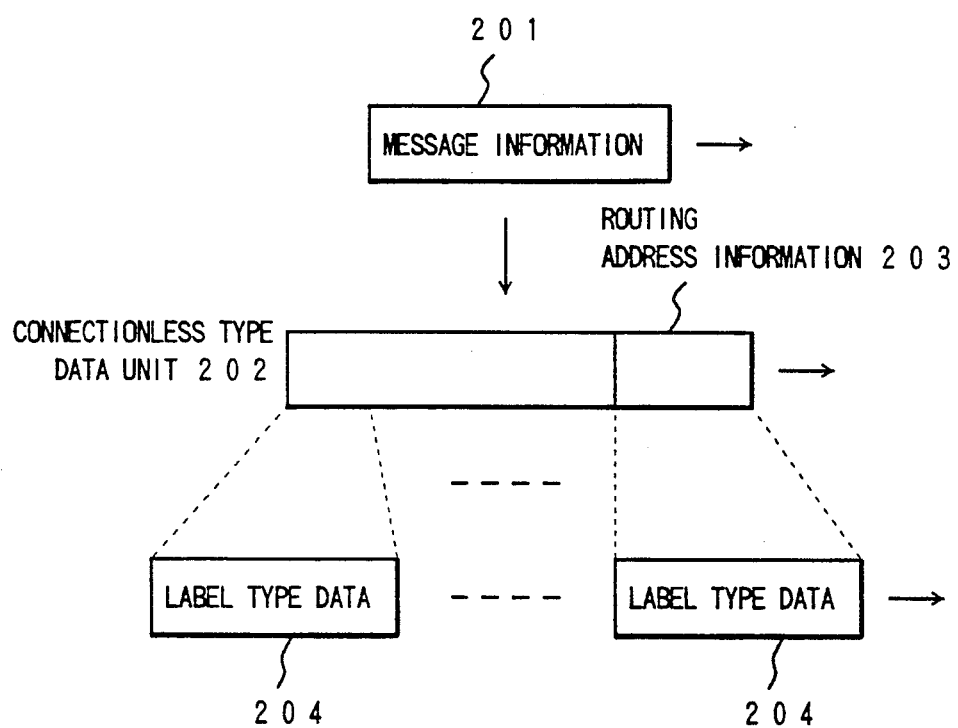
FIG. 7 is a diagram of a data structure used in the first embodiment of the invention.

Referring to FIG. 6, a routing unit 107 is provided within a switching node 106 in the label multiplexing type network. The routing unit 107 receives label type data 104 of the connectionless type transferred through a predetermined logical communications path 103. The routing unit 107 executes routing control per connectionless type data. The routing control is such that the label type data received through the logical communications path 103 is output, on the basis of routing address information 203 (see FIG. 7) detected from the received label type data, to a logical communications path 103 formed in one of a plurality of transfer routes 101 connected to the switching node 106.

More specifically, the routing unit 107 operates so that if segment type information added to the header of each cell transferred through the predetermined logical communications path 103 indicates the beginning one of a series of cells obtained by segmenting a data unit 202 (FIG. 7) into a plurality of parts, the routing control is carried out based on routing address information 203 (FIG. 7) contained in the beginning cell. When the above segment type information indicates a subsequent cell other than the beginning cell out of the cells obtained by segmenting the data unit 202 into cells, the routing unit 107 executes the same routing control as in the case of the beginning cell having a message identifier which is the same as that contained in the above subsequent cell.

The routing unit 107 includes a transfer route retrieving unit, and a message identifier management unit in order to execute the above routine control. The transfer route retrieving unit selects, with respect to the beginning cell, one of the transfer routes 101 connected to the switching node 106 in accordance with the routing address 203 contained in the beginning cell. The message identifier management unit stores a relation between the message identifier contained in the beginning cell and the transfer route 101 selected for the beginning cell, and selects, with respect to each subsequent cell having the same message identifier as the beginning cell, the same transfer route as in the case of the beginning cell.

A plurality of port units 108 are provided for the respective transfer routes 101. Each of the port units 108 includes a first buffer unit 109, a second buffer unit 110, and a cell transfer control unit 111. The first buffer unit 109 controls transfer of label type data 112 of the connection-oriented type, which is transferred through the logical communications path 102, which is established per call control process. The second buffer unit 110 controls transfer of label type data 104 of the connectionless type, which is transferred through the predetermined logical communications path 103. The cell transfer control unit 111 controls a distribution of the label type data 104 and 112 to the transfer route connected to the cell transfer control unit 111. More specifically, each of the port units 108 is provided for one of network-node interfaces which connects the related switching node 106 and another switching node. The cell transfer control unit 111 reads the label type data 104 of the connectionless type from the second buffer unit 110 if such data 104 is held in the second buffer unit 110 in a case where all label type data 112 of the connection-oriented type have been read from the first buffer unit 109 and there is no connection-oriented type data therein.

A call processor 113, which is provided in the switching node 106, executes a call control process as in the case of the normal connection-oriented type communications system. That is, the call processor 113 does not execute the call control process with respect to the label type data 104 of the connectionless type transferred through the predetermined logical communications path 103. This means that the call processor 113 does not operate on any cell having the header showing the predetermined permanent virtual channel PVC.

The routing unit 107 includes an abandonment detection unit, and an abandonment control unit. The abandonment detection unit detects abandonment of a cell transferred through the predetermined logical communications path 103. The abandonment control unit abandons subsequent cells, each having the same message identifier as the abandoned cell detected by the abandonment detection unit.

Further, the routing unit 107 in the switching node 106 monitors traffic status of each of the transfer routes 106 connected thereto, and executes routing control intended to output the label type data 104 of the connectionless type to the predetermined logical communications path 103 on a most suitable one of the transfer routes 101 connected to the switching node 106 on the basis of the results of monitoring.

The above routing control is implemented by a storage status monitor unit and a storage information notification unit. The storage status monitor unit monitors the storage status of the second buffer unit 110 in the following manner- That is, the storage status monitor unit determines whether or not the quantity of label type data 104 of the connectionless type stored in the second buffer unit 110 has become smaller than a first threshold value from a value larger than the first threshold value. Further, the storage status monitor unit determines whether or not the quantity has become larger than a second threshold value larger than the first threshold value from a value smaller than the second threshold value.

The storage information notification unit informs the routing unit 107 and the call processor 113 of a change in the results of monitoring by means of the storage status monitor unit. As has been described previously, the network includes at least one switching node 106. When the network includes a plurality of switching nodes 106, the storage information notification units respectively provided in the switching nodes 106 are mutually connected to the routing units 107 and the call processors 113 by means of a parallel bus means. When one of the routing units 107 is informed, from the information storage notification unit in any one of the port units 108, that the quantity of the label type data 104 of the connectionless type stored in the second buffer unit 110 has become larger than the second threshold value the routing unit 107 informed of the above executes routing control so that the transfer route 101 relating to the port unit 108 from which the above notification is sent is inhibited from being selected.

When one of the routing units 107 is informed, from the information storage notification unit in any one of the port units 108, that the quantity of the label type data 104 stored in the second buffer unit 110 has become smaller than the first threshold value, the routing unit 107 informed of the above executes routing control so that the transfer route 101 relating to the port unit 108 from which the above notification is sent is permitted to be selected.

When the call processors 113 is informed, from the information storage notification unit in any one of the port units 108, that the quantity of the label type data 104 of the connectionless type has become larger than the second threshold value, the call processor 113 regulates the acceptance of new calls transferred in the connection-oriented type communications system using the transfer route 101 relating to the port unit 108 from which the above notification is sent. When the call processor 113 is informed, from the information storage notification unit in any one of the port units 108, that the quantity of the label type data 104 of the connectionless type has become smaller than the first threshold value, the call processor 113 removes the regulation to the acceptance of new calls transferred in the connection-oriented type communications system using the transfer route 101 relating to the port unit 108 from which the above notification is sent.

The call processor 113 in each of the switching nodes 106 transfers call control information between the terminal which performs the connection-oriented communications and the switching node or between the switching nodes in the same manner as in the case of the normal label multiplexing type switching networks. In the above manner, the call control process for the connection-oriented type communications services is carried out.

Meanwhile, the routing unit 107 in each of the switching nodes 106 is constantly connected to the predetermined permanent communications path 103 (which is a path satisfying a condition such that $VPI+VCI-0$ where VPI is the virtual path identifier and VCI is the virtual channel identifier) formed on the network-node interface between the switching nodes 106 or between the terminal 101 including the connectionless type data assembly unit 105 and the switching node 106. In this manner, a routing network of arbitrary topology is formed.

As has been described above, the first embodiment of the present invention has an essential feature in which the label type data 104 of the connectionless type is transferred through the predetermined logical communications path 103.

The routing unit 107 in each of the switching nodes 106 selects one of the transfer routes 101 connected thereto in accordance with the status of storage of cells in each of the port units 108 connected to the routing unit 107 being considered, and outputs the label type data 104 of the connectionless type to the selected transfer routes 101 through a switch (not shown). In the above manner, the label type data 104 of the connectionless type is transferred to the target terminal (LAN or the like) through the predetermined logical communications path 103 on the transfer route 101 selected in each of the switching nodes 106. The above is another essential feature of the first embodiment of the present invention.

With the above first and second essential features, it becomes possible to efficiently integrate, with the connection-oriented type communications services in the ATM networks or the like, the aforementioned secondary communications services, such as telemetering and the transaction processing, in the form of the connectionless type communications services.

Further, as has been explained previously, the cell transfer control unit 111 reads the label type data 104 of the connectionless type from the second buffer unit 110 if such data 104 is held in the second buffer unit 110 in a case where all label type data 112 of the connection-oriented type have been read from the first buffer unit 109 and there is no connection-oriented type data therein. With the above, commutation information can be placed in an idle time slot per a cell (frame or packet) unit, and hence an idle time in each traffic in the virtual calls VC in each link (interface) can be efficiently used. Hence, it becomes possible to realize statistically efficient multiplexing of a plurality of virtual calls.

Figure 8:
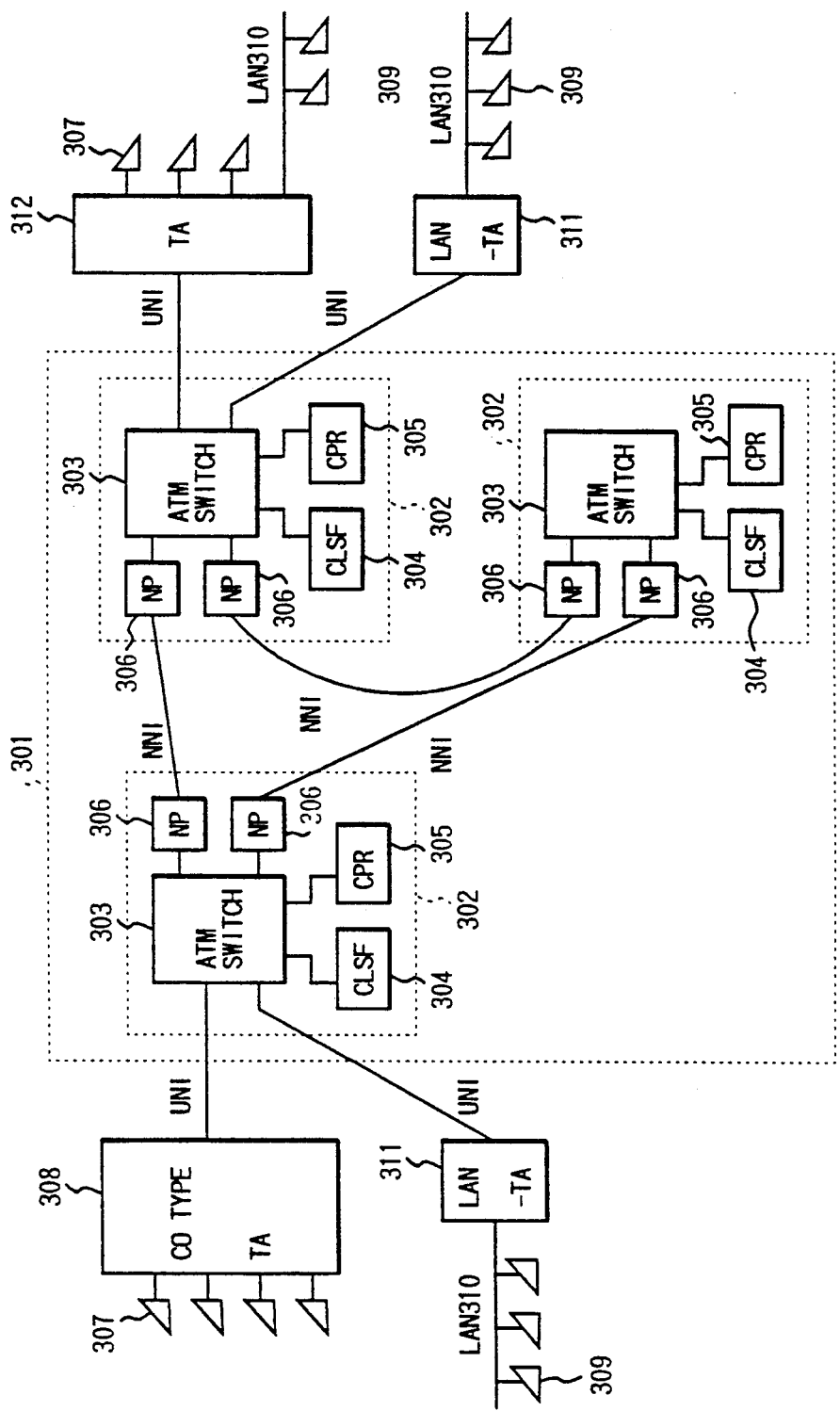
FIG. 8 is a block diagram of a LAN connection in a case where the present invention is applied to an ATM switching network.

FIG. 8 is a block diagram showing a LAN connection formed when the present invention is applied to an ATM switching network. A connection-oriented type terminal adapter (hereinafter simply referred to as CO type terminal adapter) 308 is connected to an ATM network 301 through an user-network interface UNI. A plurality of connection-oriented terminals (hereinafter simply referred to as CO type terminals) 307 are connected to the CO type terminal adapter 308. A plurality of LANs 310 are coupled to the ATM network 301 through respective LAN-terminal adapters 311 and user-network interfaces UNI. A group of terminals 309, which are connected to a corresponding one of the LANs 310, are connectionless type terminals (hereinafter simply referred to as CL type terminals), which transfer data without call control processing. Examples of the CL type terminals are computers that form a network together with CL type terminals connected to another LAN 310.

Each of the LAN-terminal adapters 311 terminates up to the network layer of the LAN protocol, and executes filtering of a local message within the related LAN 310 and a message requesting communications with another LAN 310 through the ATM network 301. Each of the LAN-terminal adapters 311 receives a request for communications through the ATM network 301, and converts a LAN message into data units of the connectionless type (CL-DU). Further, each of the LAN-terminal adapters 311 segments each of the CL type data units into ATM cells of the connectionless type, each ATM cell having a header such that VPI+VCI=0. These ATM cells are output to the ATM network 301.

As shown in FIG. 8, the CO type terminals 307 and the LAN 310 are connected to a terminal adapter (TA) 312, which integrally accommodates these terminals. In this case, the terminal adapter 312 includes the functions of the LAN-terminal adapter 311. Further, although not shown in FIG. 8, CO type ATM terminals respectively equipped with built-in terminal adapters may be directly connected to the ATM network 301.

The ATM network 301 has a configuration in which a plurality of switching nodes 302 are connected to each other through network-node interfaces NNI. Each of the switching nodes 302 comprises an ATM switch 303, a call processor (CPR) 305, a connectionless services function (CLSF) unit 304 and NNI network ports (NP) 306. The connectionless services function unit 304 is also referred to as a datagram router (DGR).

In each of the switching nodes 302, the ATM switch 303 switches connection-oriented type cells for use in transfer of information by self-routing. Further, the ATM switch 303 switches cells for use in call control in the CO type communication services to the call processor 305, and outputs CL type cells to the connectionless services function unit 304.

The call processor 305 performs the call control process in the CO type communications services. The call processor 305 is the same as the general call processor shown in FIG. 1. The connectionless services function unit 304, which is one of the essential features of the first embodiment of the present invention, performs the connectionless type cell switching process.

Each of the NNI network ports 306 terminates the network-node interfaces NNI, and separately buffers the CO type cells and the CL type cells. Then, each of the NNI network ports 306 selectively outputs the buffered cells. Use of the NNI network ports 306 is one of the essential features of the present invention. Terminating devices which terminate on the UNI side of the ATM network 302 is omitted for the sake of simplicity.

A description will now be given of the entire operation of the network shown in FIG. 8.

Figure 1:
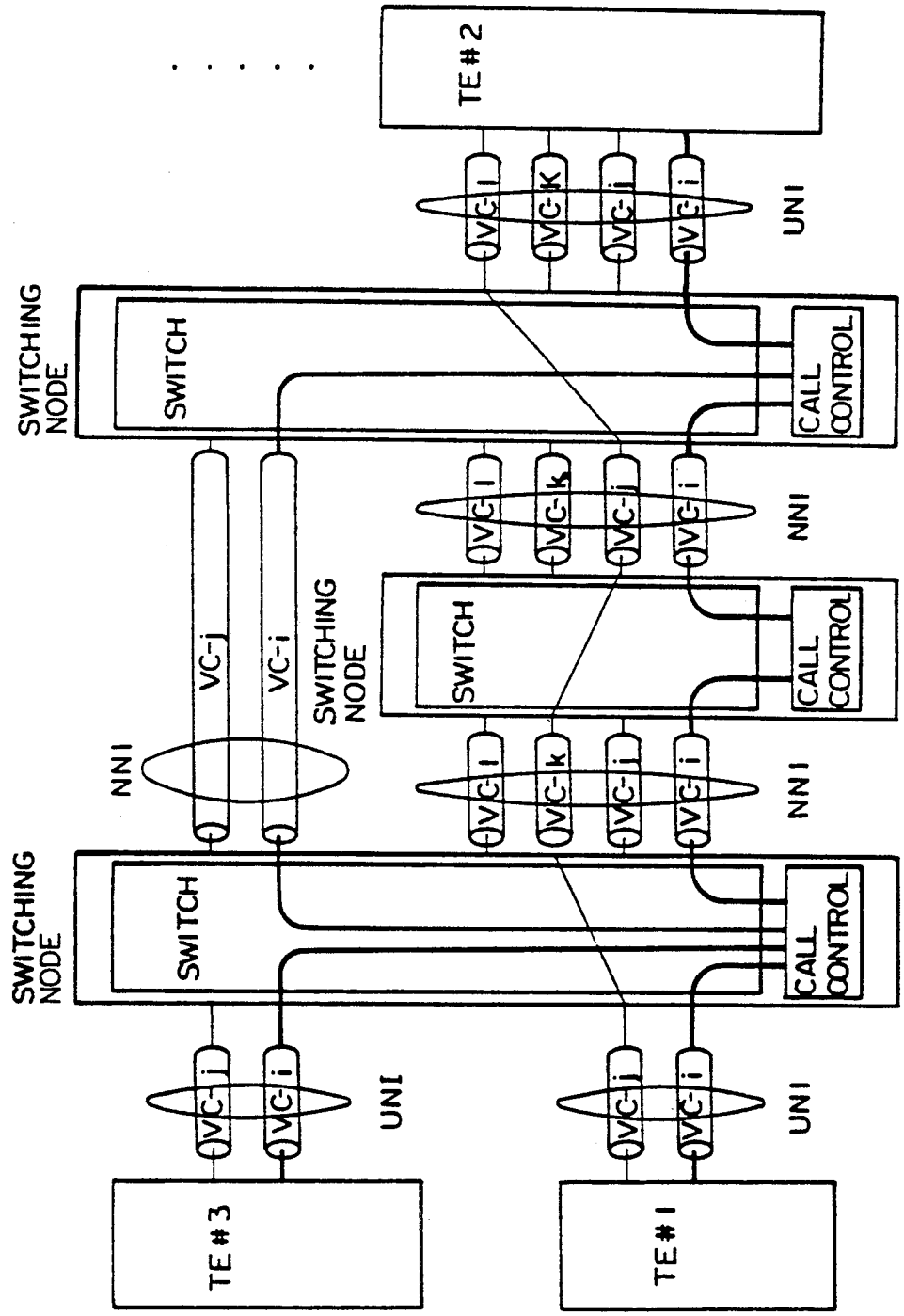
Figure 2:
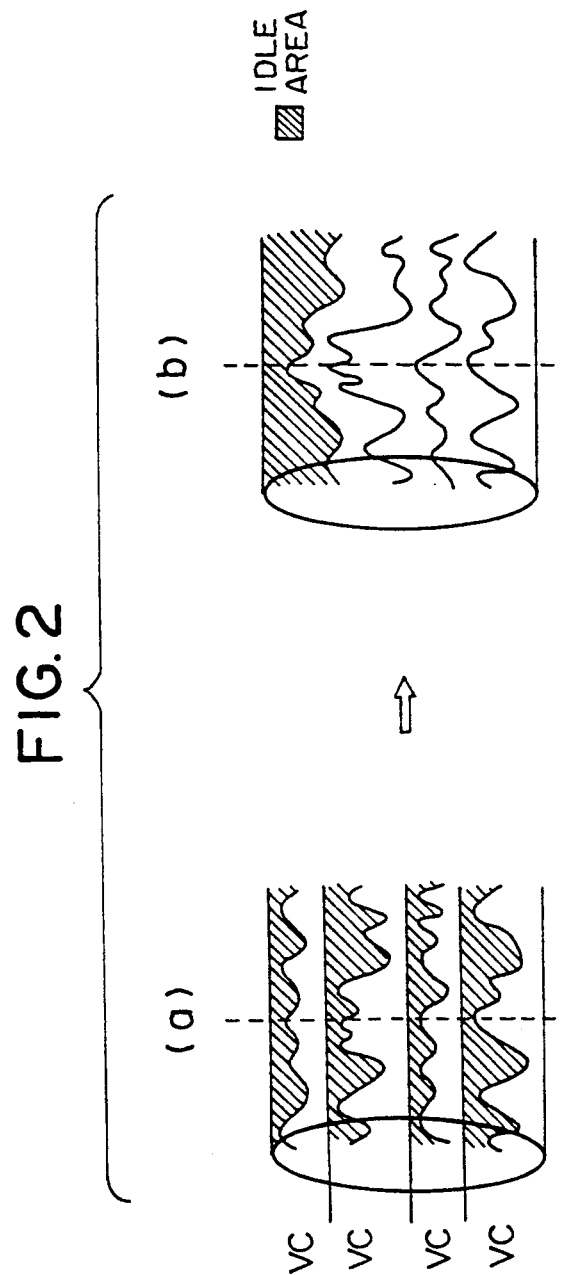
FIG. 2 is a diagram showing statistical multiplexing.

The call processor 305 in each of the switching nodes 302 transfers the call control information between the CO type terminals 307 and the switching node 302 or between the switching nodes 302, using the permanent virtual channel PVC for use in signaling as in the case of the label multiplexing type switching network as shown in FIG. 1. In this way, the call control process for the CO type communications services is performed. This is the same as the conventional process.

Figure 9:
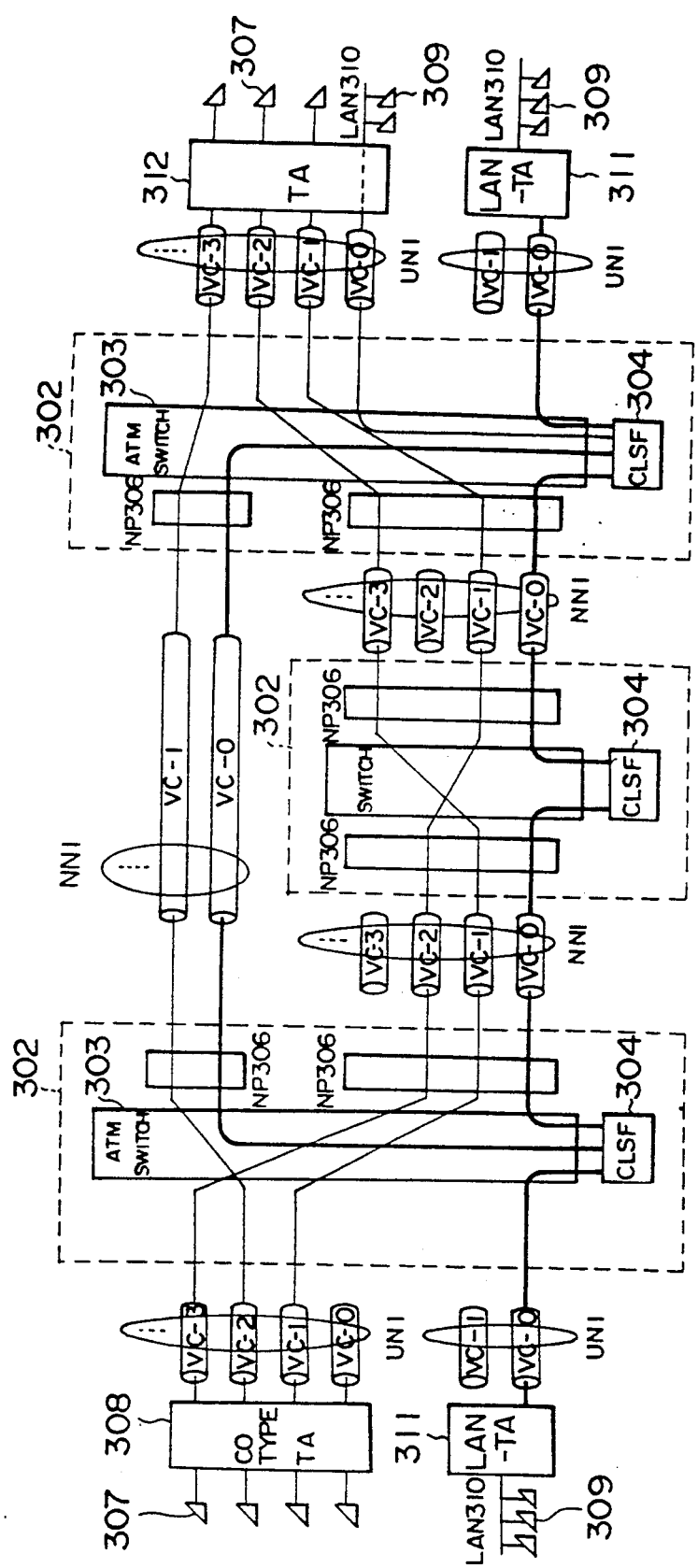
FIG. 9 is a block diagram of the structure of a connectionless services function unit network and a LAN connection.

As has been described previously, each of the switching nodes 302 is equipped with the connectionless services function units (hereinafter simply referred to as CLSF units) 304, which executes routing for each CL type cell transferred from the LAN-terminal adapter 311. As shown in FIG. 9, the CLSF units 304 shown in FIG. 8 are constantly connected, on the network-node interface between the switching nodes 302 or the user-network interface UNI, to each other through the permanent virtual channels PVC identified by a special identifier. In this manner, a connectionless services function network having an arbitrary topology is formed. In the configuration shown in FIG. 9, the permanent virtual channel which connects the CLSF units 304 to each other meets a condition such that VPI+VCI =0 where VPI is the virtual path identifier added to the header of each ATM cell and VCI is the virtual channel identifier added thereto. In FIG. 9, the above permanent virtual channel PVC is indicated by VC-0 and depicted by thick solid lines. In FIG. 9, the call processors 305 shown in FIG. 8 and the permanent virtual channels PVC (see FIG. 1) are omitted for the sake of simplicity. The CL type ATM cells are transferred through the predetermined permanent virtual channel. This is the first essential feature of the first embodiment of the present invention.

The CLSF unit 304 in each of the switching nodes 302 selects one of the NNI network ports 306 connected thereto in accordance with the routing address RA extracted from the ATM cell amounting to one message of the CL type and the cell storage status in each of the NNI network ports 306, and the ATM cell of the CL type to the selected NNI network port 306 through the ATM switch 303. In this manner, the ATM cell of the CL type is transferred to the target LAN 310, using the predetermined permanent virtual channel PVC on the user-network interface UNI or the network-node interface NNI connected to the NNI network port 306 selected in each of the switching nodes 306. As has been described previously, the specific permanent virtual channel PVC satisfies VPI+VCI=0, for example. The above is the second essential feature of the first embodiment of the present invention.

By the above-mentioned first and second essential features of the first embodiment of the present invention, it becomes possible to efficiently integrate, with the connection-oriented type communications services in the ATM networks or the like, the aforementioned secondary communications services, such as telemetering and the transaction processing, in the form of the connectionless type communications services.

Each of the NNI network ports 306 outputs the ATM cell of the CL type to the user-network interface UNI or the network-node interface NNI when all ATM cells of the CO type have been output therefrom. Hence, in each interface, the CO-type traffic-idle areas can be filled with CL-type traffic using the predetermined permanent virtual channel PVC. As a result, it becomes possible to efficiently multiplex a plurality of virtual channels VC statistically. This is the third essential feature of the first embodiment of the present invention.

A further description will now be given of the structural elements shown in FIG. 8.

Figure 10:
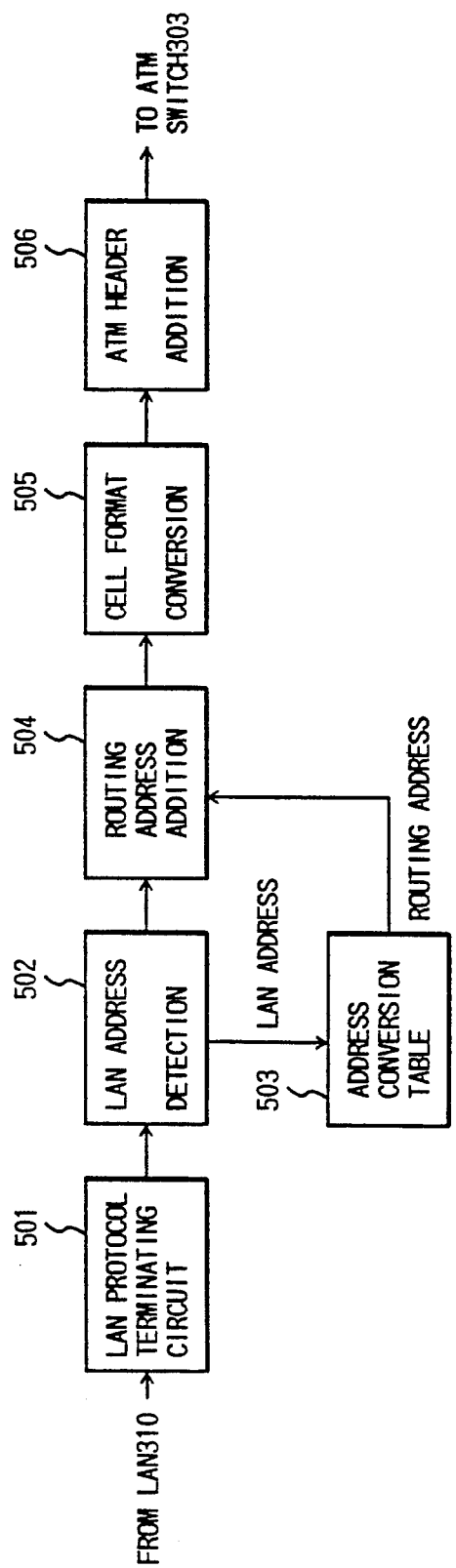
FIG. 10 is a block diagram of a LAN-terminal adapter used in the first embodiment of the present invention.

FIG. 10 is a block diagram of each of the LAN-terminal adapters 311 shown in FIG. 8. As shown, each LAN-terminal adapter 311 comprises a LAN protocol terminating circuit 501, a LAN address detection circuit 502, an address conversion table 503, a routing address addition circuit 504, a cell format conversion circuit 505, and an ATM header addition circuit 506.

The LAN protocol terminating circuit 501 terminates up to the protocol data unit (N-PDU) of the network layer of a LAN protocol (a protocol called TCP/IP, for example) with respect to each LAN message transferred from the CL type terminals 309 in order to identify the LAN 310 to which the destination terminal is connected in the ATM network 301. Then, the LAN protocol terminating circuit 501 filters a local message in the LAN 301 to which the LAN protocol terminating circuit 501 being considered is connected, and a message requesting communications with another LAN 310 through the ATM network 301.

Figure 11:
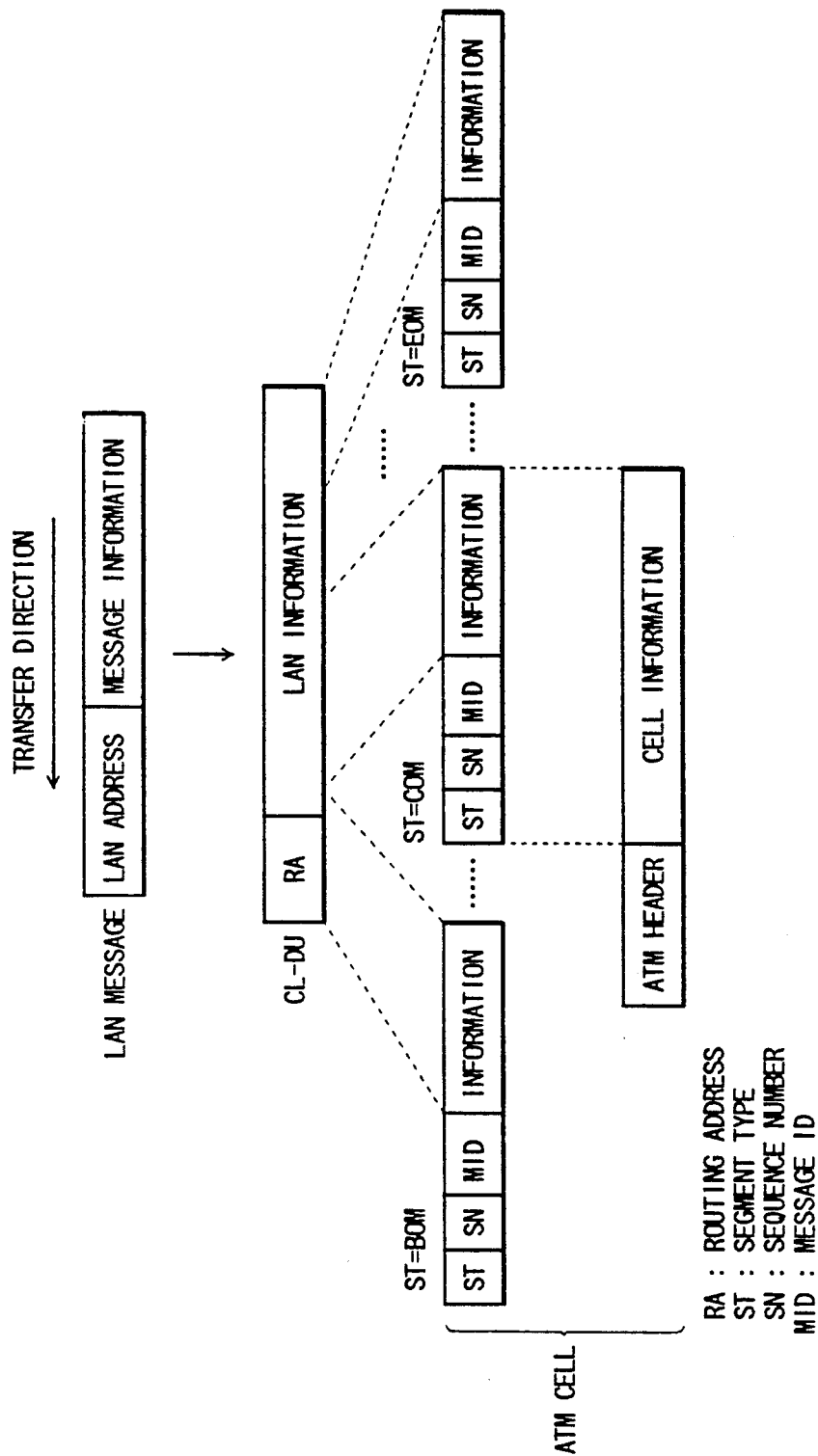
FIG. 11 is a diagram showing how ATM cells are derived from a LAN message.

The LAN address detection circuit 502 detects, from the LAN message which is terminated, at the LAN protocol terminating circuit 501, up to the protocol data unit in the network layer, the address of the LAN 310 to which the destination terminal is connected (the above address is called a LAN address). An example of the LAN message is shown in FIG. 11. Then the LAN address detection circuit 502 outputs the detected LAN address to the address conversion table 503. Further, the LAN address detection circuit 502 outputs LAN information having a format including only message information obtained by deleting the LAN address from the LAN message. The LAN information may be the LAN message itself including both the LAN address and the LAN message.

The address conversion table 503 converts the LAN address into a corresponding routing address RA, which consists of a maximum of 16 bits. The routing address RA is output to the routing address addition circuit 504.

The routing address addition circuit 504 adds the routing address RA to the LAN information from the LAN address detection circuit 502, so that a CL type data unit (CL-DU) as shown in FIG. 11 is generated. The CL type data unit is output to the cell format conversion circuit 505.

The cell conversion circuit 505 converts the CL type data unit segments into ATM cells, as shown in FIG. 11. A beginning portion of each ATM cell includes data showing a segment type ST, a sequence number SN and a message identifier MID. The message identifier MID shows a message identifier inherent to each LAN message. A BOM (Beginning Of Message) code is added, as the segment type ST, to the first (beginning) message out of the ATM messages which corresponds to a beginning portion of the CL type data unit. An EOM (End Of Message) code is added, as the segment type ST, to the last message out of the ATM messages which corresponds to an end portion of the CL type data unit. A COM (Continuation Of Message) code is added, as the segment type ST, to each ATM message other than the first and last ATM messages. When the data length of the CL type data unit is less than or equal to that of the cell information part in the ATM cell, an SSM (Single Segment Message) code is added, as the segment type ST, to the ATM cell because the CL type data unit can be included in one ATM cell. Further, a number showing the cell position in a series of the segmented ATM cells is added to each ATM cell, in which the number added to the first ATM cell is "1".

The routing address RA located in the beginning portion of the CL type data unit consists of a maximum of 16 bits. Hence, the routing address is accommodated in the first ATM cell without exception.

Returning now to FIG. 10, the ATM header addition circuit 506 adds an ATM header to each ATM cell, as shown in FIG. 11. The ATM header includes the virtual path identifier VPI and the virtual channel identifier specifically used for the CL type ATM cells (in the case shown in FIG. 9, VPI+VCI=0).

Figure 12:
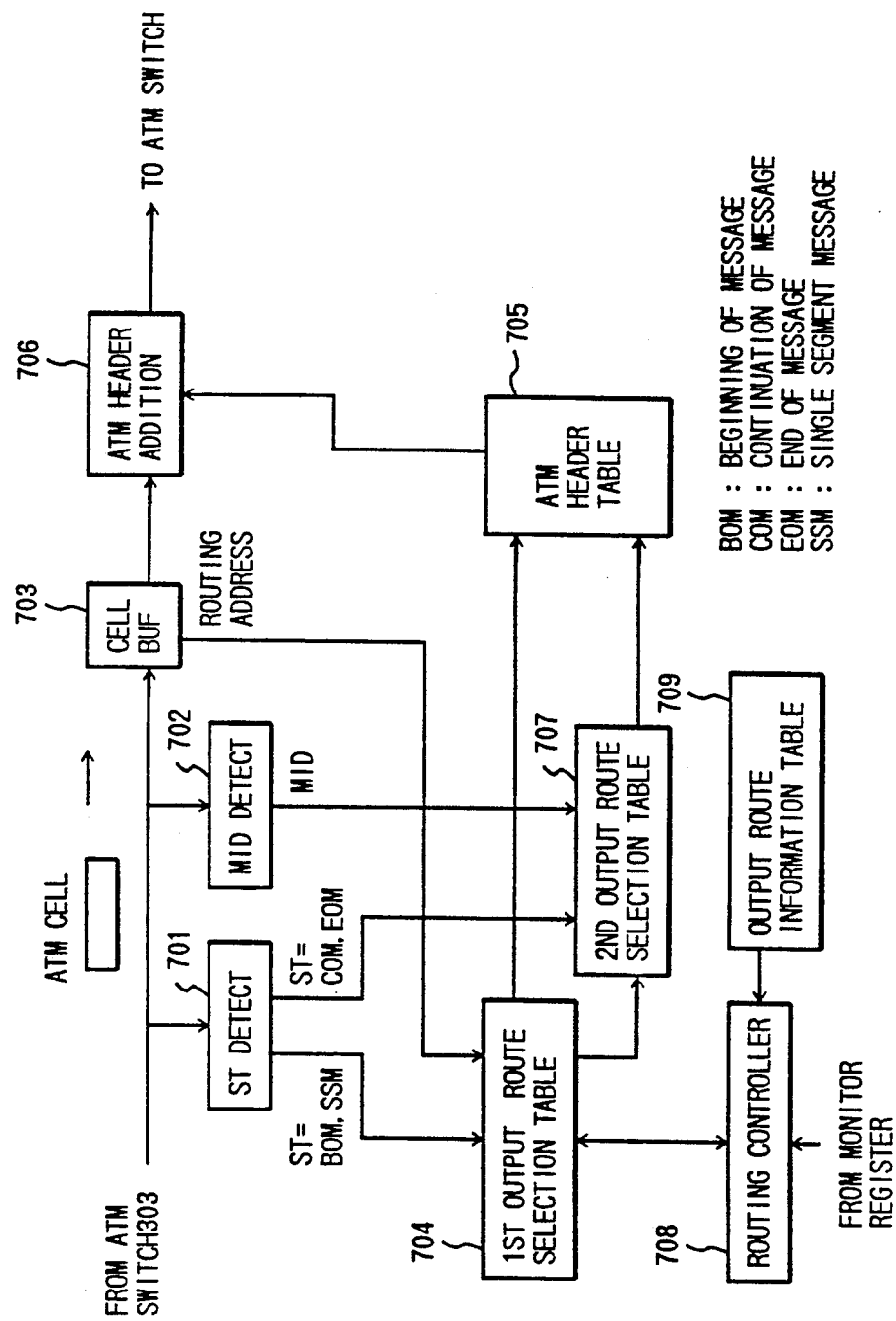
FIG. 12 is a block diagram of a routing circuit in a connectionless type services function unit used in the first embodiment of the present invention.

FIG. 12 is a block diagram of a routing circuit of the CLSF unit 304 in each of the switching nodes 302. The routing circuit provided in the CLSF unit 304 comprises a segment type (ST) detection circuit 701, a message identifier (MID) detection circuit 702, a cell buffer 703, a first output route selection table 704, an ATM header table 705, an ATM header addition circuit 706, a second output route selection table 707, a routing controller 708 and an outgoing route information table 709.

The segment type detection circuit 701 detects the segment type contained in the CL type ATM cell transferred through the predetermined permanent virtual channel PVC from the related LAN-terminal adapter 311 (FIG. 8) through the user-network interface UNI and the ATM switch 33 The message identifier detection circuit 702 detects the message type contained in the above CL type ATM cell. The CL type ATM cell is temporarily stored in the cell buffer 703.

When the detected segment type is the BOM code showing the first ATM cell or the SSM code showing a single ATM cell, the routing address RA (FIG. 11) stored in the cell information part of the ATM cell stored in the cell buffer 703 is read from the cell buffer 703. The first output route selection table 704 is accessed by the readout routing address RA. As shown in (a) of FIG. 13, the first output route selection table 704 stores an optimal output port address which specifies a most suitable output port for each routing address RA. By the above accessing, the output port address most suitable for the routing address RA of the CL type ATM cell stored in the cell buffer 703 is read from the first output route selection table 704.

Subsequently, the ATM header table 705 is accessed by the output port address read from the first output route selection table 704. The ATM table 705 stores ATM headers (tag information and so on) for transferring the ATM cells received one by one to the output ports (either on the network side or the terminal side) specified by the respective output port addresses. The ATM header corresponding to the output port address is read from the ATM header table 705 and output to the ATM header addition circuit 706.

The ATM header addition circuit 706 reads the CL type ATM cell stored in the cell buffer 703, and adds the ATM header read from the ATM header table 705 to the readout ATM cell. In this manner, the CL type ATM cell is output to the target NNI network port 306 through the ATM switch 303 shown in FIG. 8, and transferred to the CLSF unit 304 in another switching node 302 through the predetermined permanent virtual channel PVC such that VPI+VCI=0 on the network-node interface NNI connected to the target NNI network port 306. Alternatively, when the destination of the CL type ATM cell is the LAN 310 connected to the LAN-terminal adapter 311 or terminal adapter 312 connected to the switching node 302 being considered, the ATM cell is output to the output port (specifically not shown in FIG. 8) of the related LAN-terminal adapter 311 or the related terminal adapter 312 through the ATM switch 303. Then, the above ATM cell is transferred to the LAN-terminal adapter 311 or the terminal adapter 312 through the predetermined permanent virtual channel PVC satisfying VPI+VCI=0 on the user-network interface UNI.

When the segment type detected by the segment type detection circuit 701 is the BOM code showing the first (beginning) ATM cell or the SSM code showing a single ATM cell, in parallel to the above operation, the message identifier MID (FIG. 11) detected by the message identifier detection circuit 702 and the output port address read from the first output route selection table 704 are applied to the second output route selection table 707. As shown in (b) of FIG. 13, the second output route selection table 707 stores output port addresses respectively related to the message identifiers MID. That is, only one output port address is specified by one message identifier MID.

When the segment type ST detected by the segment type detection circuit 701 is the COM code showing an ATM cell other than the first and last ATM cells, or the EOM code showing the last ATM cell, the second output route selection table 707 is accessed by the message identifier MID detected by the message identifier detection circuit 702, while the first output route selection table 704 is not accessed. The message identifier MID and the message identifier inherent to the above message identifier MID are added to each of a group of CL type ATM cells in which information pieces obtained by segmenting one LAN message are separately stored. As has been described previously, the output port address determined based on the first ATM cell out of a group of the CL type ATM cells is stored in the second output route selection table 707. The CL type ATM cells originated from one LAN message are sequentially stored in the CLSF unit 304. During this operation, each time one ATM cell is received and the message identifier is detected therefrom, the same output port address is read from the second output route selection table 707 by the above message identifier MID.

The ATM header table 705 is accessed by output port address read in the above manner, and the ATM header relating to the above output port address is output to the ATM header addition circuit 706 as in the case of the first ATM cell or the single ATM cell. The ATM header addition circuit 706 reads the CL type ATM cell from the cell buffer 703, and adds the ATM header read from the ATM header table 705 to the readout ATM cell. The ATM cell with the ATM header added thereto is output to the ATM switch 303.

When the segment type ST detected by the segment type detection circuit 701 is the EOM code showing the last ATM cell, the second output route selection table 707 is accessed and the registration of the message identifier MID and the related output port address are deleted from the second output route selection table 707.

The routing controller 708 shown in FIG. 12 reads the contents of a monitor register which stores the cell storage status information sent from the NNI network ports 306 through storage information notification buses 1101, which will be described later. Then the routing controller 708 updates the contents of the first output route selection table 704 by referring to the output path information table 709 on the basis of the storage status of CL type ATM cells in a CL type output buffer (which will be described later) in each of the NNI network ports 306 monitored through the monitor register. This updating operation will be described in detail later.

Figure 14:
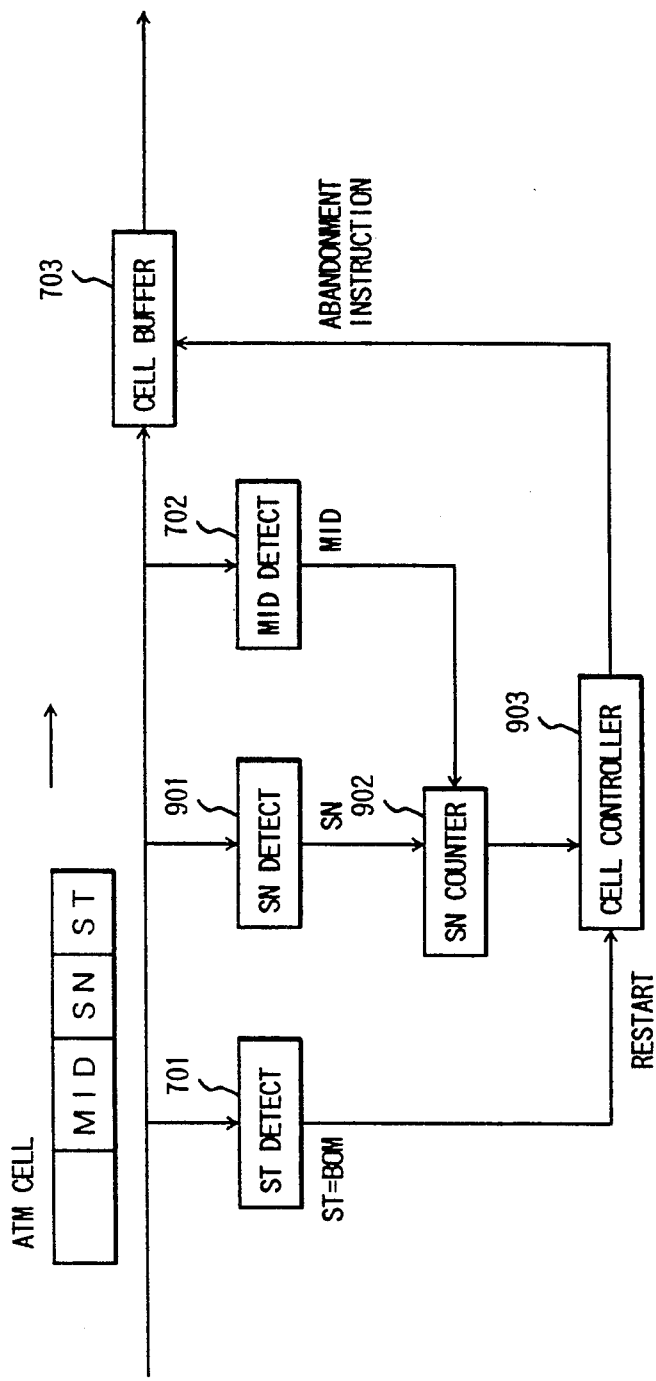
FIG. 14 is a block diagram of a cell abandonment processing circuit in the connectionless services function unit used in the first embodiment of the present invention.

FIG. 14 is a block diagram of a cell abandonment processing circuit in the CLSF unit 304 in each of the switching node. In FIG. 14, those parts which are the same as those shown in FIG. 12 are given the same reference numerals. That is, the segment type detection circuit 701, the message identifier detection circuit 702 and the cell buffer 703 are also shown in FIG. 12. Further, the cell abandonment processing circuit shown in FIG. 14 comprises a sequence number (SN) detection circuit 901, a sequence number (SN) counter 902, and a cell controller 903.

The sequence number detection circuit 901 detects the sequence number SN contained in the incoming CL type ATM cell, and the segment type detection circuit 701 detects the segment type therein. The message identifier detection circuit 702 detects the message identifier contained in the above CL type ATM cell.

The sequence number counter 902 determines, per message identifier detected by the message identifier detection circuit 702, that is, per LAN message, whether or not the sequence numbers SN detected in the sequence number detection circuit 901 continuously change. That is, the sequence number counter 902 includes counters respectively relating to the message identifiers detected by the message identifier detection circuit 702. When the sequence number counter 902 detects the fact that a change in the sequence number SN is not continuous, the cell controller 903 resets the counter in the sequence number counter 902 relating to the message identifier detected by the message identifier detection circuit 702 at this time. Further, the cell controller 903 instructs the cell buffer 703 to abandon the received CL type ATM cell. Thereby, all CL type ATM cells subsequent to the above CL type ATM cell are abandoned. That is, meaningless transfer of CL type ATM cells can be avoided. When the segment type detected by the segment type detection circuit 701 is the BOM code and the message identifier detected by the message identifier detection circuit 702 is the same as that of the message identifier which was input for the first time, the abandonment processing with respect to a string of ATM cells relating to one LAN message is restarted in the cell controller 903.

Figure 15:
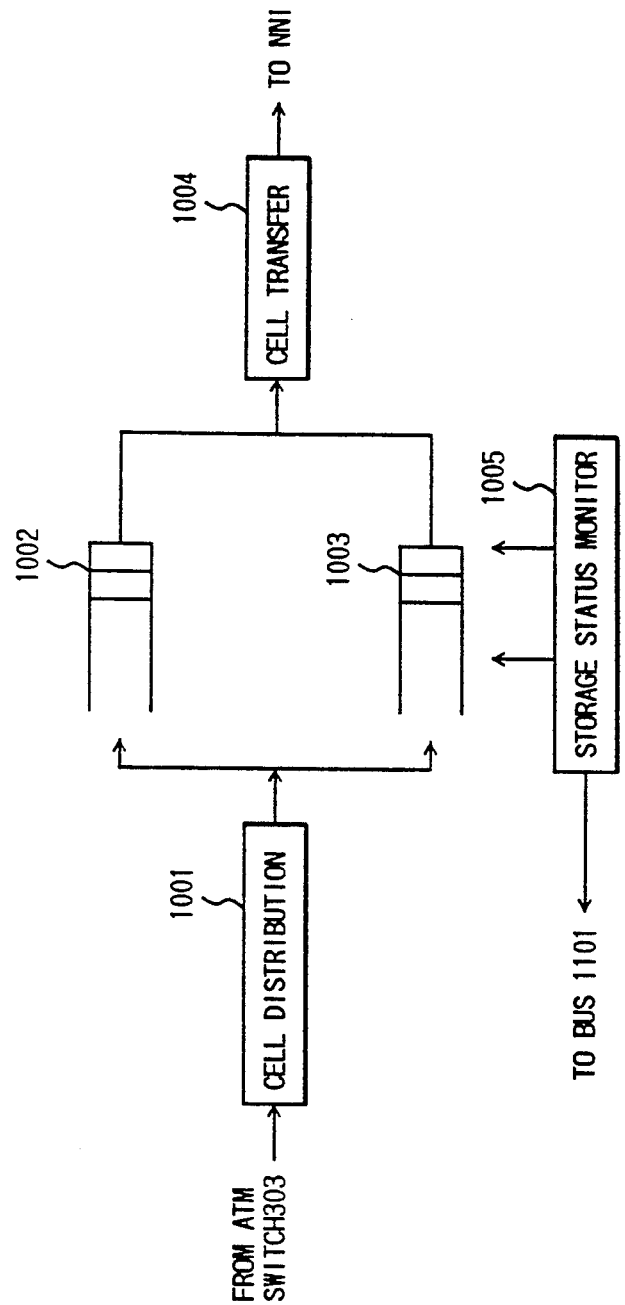
FIG. 15 is a block diagram of an network-node interface terminal adapter.

FIG. 15 is a block diagram of each of the NNI network ports 306 (FIG. 8) provided in each switching node 302. Each NNI network port 306 comprises a CO type output buffer 1002, a CL type output buffer 1003, and a storage status monitor circuit 1005. Output control of CO type ATM cells is performed using the CO type output buffer 1002, and output control of CL type ATM cells is performed using the CL type output buffer 1003. Further, each NNI network port 306 comprises a cell distribution circuit 1001 and a cell transfer circuit 1004.

The cell distribution circuit 1001 identifies the header of the ATM cell output from the ATM switch 303 (FIG. 8), and determines whether or not the virtual path identifier VPI and the virtual channel identifier VCI meeting the condition, VPI+VCI=0, have been added to the identified ATM header. When it is determined that these identifiers have been added to the ATM header, the cell distribution circuit 1001 outputs the ATM cell being considered to the CL type output buffer 1003. When it is determined that the identified ATM header does not have the above identifiers, the cell distribution circuit 1001 outputs the ATM header being considered to the CO type output buffer 1002.

When there are ATM cells stored in the CO type output buffer 1002, the cell transfer circuit 1004 outputs these ATM cells to the network-node interface NNI (FIG. 8) connected to the cell transfer circuit 1004. When there is no ATM cell stored in the CO type output buffer 1002, the cell transfer circuit 1004 outputs ATM cells stored in the CL type output buffer 1003 to the network-node interface NNI connected to the cell transfer circuit 1004.

The storage status monitor circuit 1005 shown in FIG. 15 monitors the quantity of data stored in the CL type output buffer 1003, that is, the number of ATM cells stored therein, and compares the data quantity with the aforementioned first and second threshold values where the first threshold value is smaller than the second threshold value. When the result of this comparison changes, the storage status monitor circuit 1005 outputs this change in the result of the comparison to the aforementioned storage information notification buses 1101.

Figure 16:
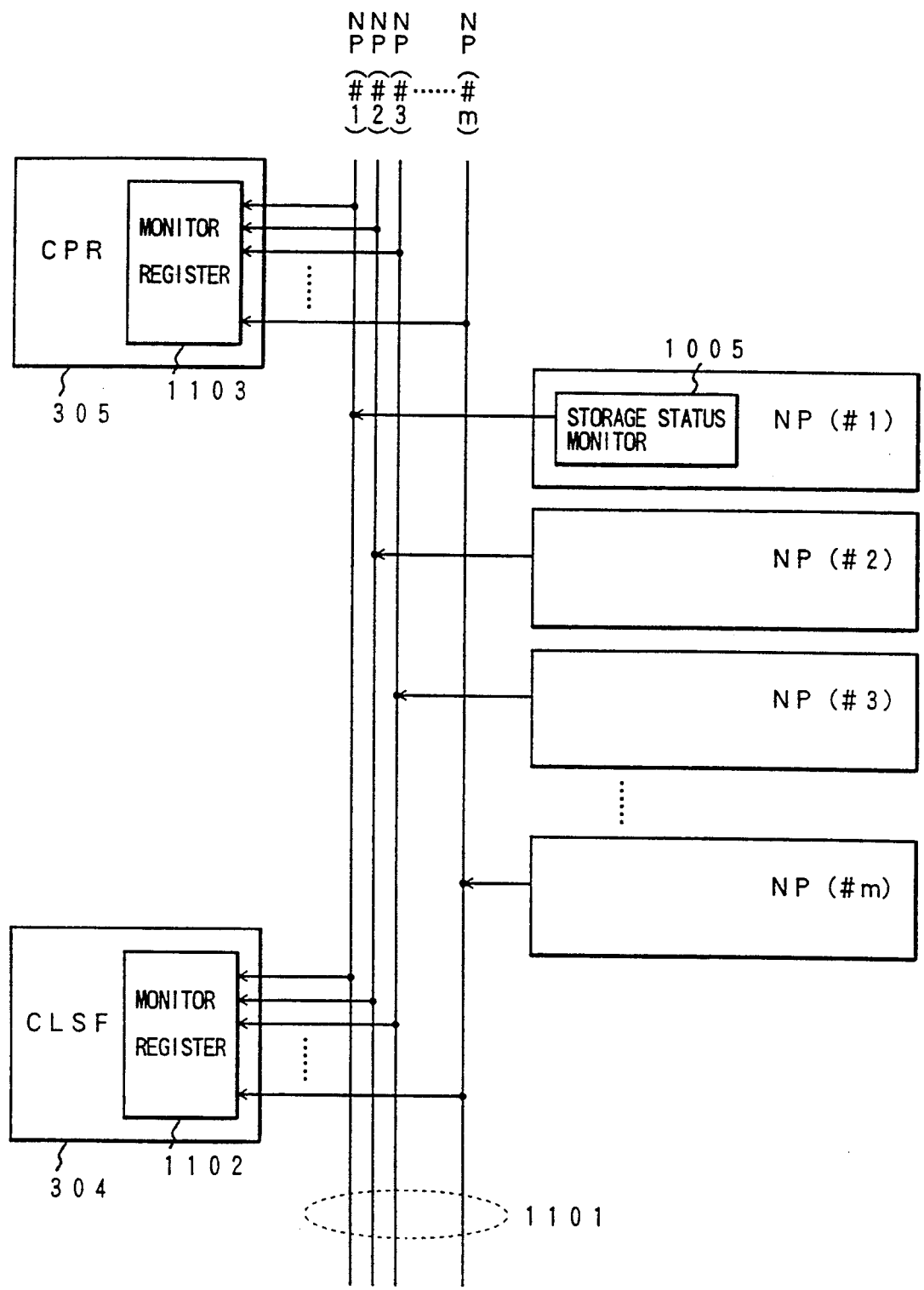
FIG. 16 is a block diagram showing how network-node interface terminal adapters, a call processor and a connectionless type services function unit are connected to each other.

FIG. 16 shows the storage information notification buses 1101. The storage information notification buses 1101 are equal in number to the NNI network ports 306 provided in the associated switching node 306. The NNI network ports (NP) 306 are respectively assigned physical numbers #1, #2, ..., #m (m is an integer), as shown in FIG. 16. In this case,, m storage information notification buses 1101 are provided.

The storage status monitor circuit 1005 in each of the NNI network port 306 outputs, as an initial signal level, "0" (logic level) to the related bus line 1101. When the storage status monitor circuit 1105 detects the fact that the quantity of data stored in the CO type output buffer 1002 has become greater than the aforementioned second threshold value, the storage status monitor circuit 1105 changes the signal level of the related bus line 1101 from "0" to "1" (logic level). When the storage status monitor circuit 1105 detects the fact that the quantity of data stored in the CO type output buffer 1002 has become smaller tan the aforementioned first threshold value, the storage status monitor circuit 1105 changes the signal level of the related bus line 1101 from "1" to "0". When the signal level of one of the bus lines 1101 changes to "1", the CL type output buffer 1003 in the NNI network port 306 connected to the bus line 1101 being considered has a little available area.

The CLSF unit 304 and the call processor 305 monitors the storage information notification buses 1101 by means of monitor registers 1102 and 1103, respectively. The CLSF unit 304 executes the following control process.

As has been described previously, the output route information table 709 stores, for each routing address RA, at least one output port address. The routing controller 708 monitors the contents of the management register 1102. When the routing controller 708 detects the fact that any one of the bits in management register 1102 has changed from "0" to "1", the routing controller 708 determines that the CL type output buffer 1003 connected to the associated NNI network port 306 has a little available area. In this case, the routing controller 708 determines whether or not the output port address relating to the NNI network port 306 has been registered in the first output route selection table 704.

When the result of this determination is affirmative, the routing controller 708 reads the related routing address RA registered in the first output path selection table 704, and then sequentially reads one or more output port addresses which are related to the routing address RA and registered in the output path information table 709. The routing controller 708 updates the first output route selection table 704, making a connection between the above routing address and the first output port address having a "1"-to-"0" change in the bit in the monitor register 1102 relating to one or more NNI network ports 306 having one or more output port addresses read from the first output route selection table 704. CL type traffic input to the CLSF unit 304 after the routing controller 708 is updated is not transferred to the NNI network port 306 being considered, so that a congestion generated therein can be suppressed.

Further, when the routing controller 708 detects the fact that any one of the bits in the monitor register 1102 has changed from "1" to "0", the routing controller 708 determines that the quantity of data in the CL type output buffer 1003 in the corresponding NNI network port 306 in the switching node 304 in which the routing controller 708 being considered is provided has become smaller than the first threshold value and there is a vacancy in the available area in the CL type output buffer 1003. In this case, the routing controller 708 sets the corresponding content of the first output route selection table 704 to a default value.

The call processor 305 monitors the contents of the monitor register 1103. When the call processor 305 detects the fact that any one of the bits in the monitor register 1103 has changed from "0" to "1", the call processor 305 determines that the quantity of data stored in the CL type output buffer 1003 in the corresponding NNI network port 306 has become larger than the second threshold value and there is a little available area in the CL type output buffer 1003. In this case, the call processor 305 suppresses the acceptance of new CO type traffic addressed to the NNI network port 306 being considered. When the call processor 305 detects the fact that any one of the bits in the monitor register 1103 has changed from "1" to "0", the call processor 305 determines that the quantity of data stored in the CL type network port 1003 has become smaller than the first threshold value and there is a vacancy in the available area. In this case, the call processor 305 omits the above regulation.

It should be noted that two different threshold values are used for monitoring the quantity of data stored in the CL type output buffer 1003 by means of the storage status monitor circuit 1005. That is, the first threshold value is used when "0" is output to one of the buses 1101, and the second 15 threshold value is used when "1" is output to one of the buses 1101. This is intended to prevent the signal level from being changed each time the quantity of data has become greater or smaller than a threshold value.

It will be noted that variations and modifications of the first embodiment of the present invention can be made.

In the above-mentioned configuration of the first embodiment of the present invention, the CLSF unit 304 is provided in each of the switching nodes 302, and a loop-shaped CLSF unit network is formed. However, it is not necessary to provide the CLSF unit 304 for each of the switching nodes 302. An arbitrary arrangement between the switching nodes 302 and the CLSF units can be made if the CL type ATM cells transferred through the predetermined permanent virtual channel PVC are processed by any one of the CLSF units in the network.

In the above-mentioned configuration of the first embodiment of the present invention, the LAN messages from the LANs 310 connected to the LAN-terminal adapters 311 or the terminal adapters 312 are transferred in the ATM network 301 as the CL type ATM cells. Alternatively, it is possible for an ATM terminal to selectively perform the CO type communications and the CL type communications or to perform the two types of communications in parallel. That is, it is enough for the ATM terminal to perform the CL type communications through the specific permanent virtual channel PVC distinguishably from the CO type communications. In this case, it is possible to transfer the CO type traffic and CL type traffic on the user-network interface UNI by providing, on the user-network interface side, an output port having the same configuration as that of the NNI network port NP (FIG. 15).

It is not necessary to use one permanent virtual channel PVC for transferring the CL type ATM cells. It is possible to use two permanent virtual channels for transfer of the CL type ATM cells. The number of permanent virtual channels can be determined based on the ratio of CO type traffic to CL type traffic.

A description will now be given of a second embodiment of the present invention, which is intended to execute a load distribution control when a congestion has occurred in the predetermined permanent virtual channel PVC between the CLSF units 304 for transferring the CL type ATM cells in the first embodiment of the present invention. By the load distribution control, it becomes possible to reduce the occurrence of congestion and avoid the abandonment of CL type ATM cells.

Figure 17:
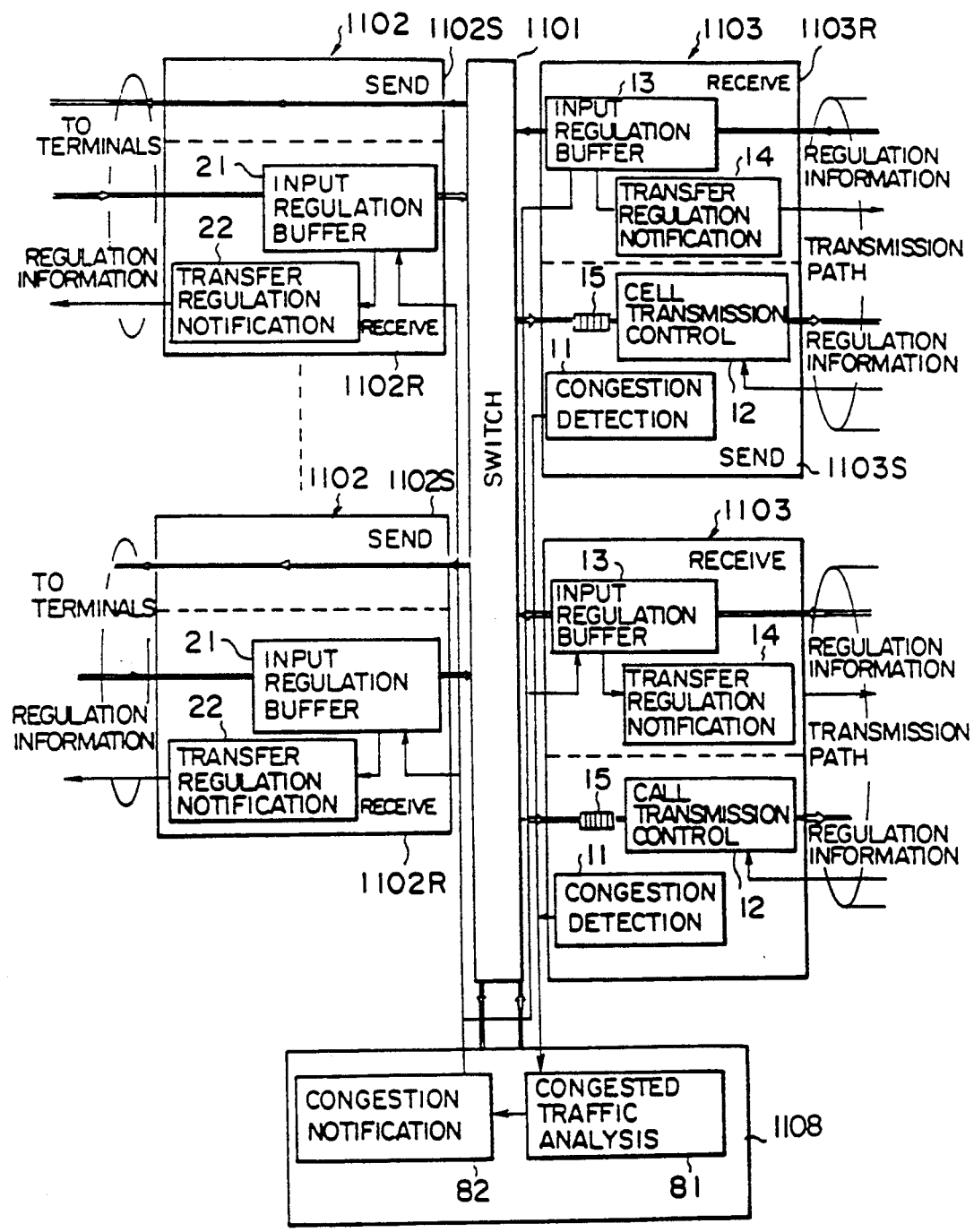
FIG. 17 is a block diagram of an overview of a second embodiment of the present invention.

FIG. 17 is a block diagram of an overview of the second embodiment of the present invention. FIG. 17 shows a switching node in an ATM network. The switching node shown in FIG. 17 comprises an ATM switch 1101, terminal accommodation units 1102, transmission path accommodation units 1103, and a CLSF unit 1108. A call processor like the call processor 305 shown in FIG. 8 is omitted for simplicity. Circuits corresponding to terminal accommodation units 1102 are not shown in FIG. 8 for simplicity. The transmission path accommodation units 1103 correspond to the aforementioned NNI network ports (NP) 306. For simplicity, FIG. 17 mainly shows the configuration which handles CL type traffic.

The CLSF unit 1108 terminates the CL type terminal protocol. The CLSF unit 1108 and terminals (not shown in FIG. 17) are coupled to each other through permanent virtual channels PVC via receiver units 1102R of the terminal accommodation units 1102 and the ATM switch 1101. The CLSF unit 1108 refers to routing information contained in a message, and outputs the message received through one of the permanent virtual channels via the receiver unit 1102R and the ATM switch to another switching node through a transmission path via the ATM switch 1101 and a sender unit 1103S of one of the transmission path accommodation units 1103. The transferred message received by the other switching node, passes through the receiver unit 1102R of one of the terminal accommodation units 1102, the ATM switch 1101, and the sender unit 1103R of one of the transmission path accommodation units 1103. Then, the message is sent to, for example, the destination terminal.

The sender unit 1103S of each of the transmission path accommodation units 1103 comprises a congestion detection unit 11 and a cell transmission control unit 12. The congestion detection unit 11 detects a link congestion and informs the CLSF unit 1108 of the detected link congestion. The cell transmission control unit 12 stops sending cells to the transmission path in accordance with transfer regulation information. The receiver unit 1103R of each of the transmission path accommodation units 1103 and the receiver unit 1102R of each of the terminal accommodation units 1102 comprises input regulation buffers 13 and 21, and transfer regulation notification units 14 and 22. Each of the input regulation buffers 13 and 21 regulates the inputting of cells to the ATM switch 1101. Each of the transfer regulation notification units 14 and 22 outputs transfer regulation information obtained at the time of the input regulation to the transmission paths or terminals.

The CLSF unit 1108 comprises a congested traffic analysis unit 81 and a congestion notification unit 82. The congested traffic analysis unit 81 analyzes congestion causing traffic in accordance with information detected by the congestion detection unit 11. The congestion notification unit 82 informs the input regulation buffers 13 and 15 of the congestion causing traffic analyzed by the congested traffic analysis unit 81.

The sender unit 1103S of each of the transmission path accommodation units 1103 comprises a transmission buffer 15, which functions to sequentially output incoming ATM cells from the ATM switch 1101 to the corresponding transmission path. If there is no transmission regulation notification from an adjacent switching node, the cell transmission control unit 12 sequentially outputs the ATM cells to the transmission path. If the ATM cells from the ATM switch 1101 are received in the form of a burst or the transmission buffer 15 has been congested, the congestion detection unit 11 detects the above situation, and notifies the CLSF unit 1108 of the situation.

In response to receipt of the congestion notification from one of the transmission path accommodation units 1103, the congested traffic analysis unit of the CLSF unit 1108 determines which traffic should be regulated in order to avoid the congestion of the transmission path accommodation unit 1103 being concerned. The congestion notification unit 82 of the CLSF unit 1108 informs each of the transmission path accommodation units 1103 and each of the terminal accommodation units 1102 of transfer regulation information showing traffic to be regulated.

Normally, the receiver units 1103R and 1102R transfer ATM cells received from the transmission paths or the terminals to the ATM switch 1101 via the input regulation buffers 13 and 21. When the receiver units 1103R and 1102R receive the transfer regulation information from the congestion notification unit 82, only ATM cells which do not relate to the traffic to be regulated are read from the input regulation buffers 21 and transferred to the ATM switch 1101, while ATM cells which relate to the traffic to be regulated are continuously held therein until a notification of cancellation of the regulation is received.

The transfer regulation notification units 14 and 22 issue transfer regulation information if there is a possibility that the input regulation buffers 13 and/or 21 will overflow due to the fact that the regulation of the receiver units 1103R and/or 1102R is continuously carried out for a long time and the input regulation buffers 13 and/or 21 are filled with ATM cells to be regulated. In response to receipt of the transfer regulation information, the sender units of transmission path accommodation units of neighboring switching nodes and/or sender parts of terminals stop sending ATM cells under the control of the cell transmission control units of the above neighboring switching nodes.

In the above-mentioned manner, traffic causing congestion to a transmission path accommodation unit 1103 is regulated, and this traffic regulation is canceled when the transmission path accommodation unit 1103 has changed from the congested state to the normal state.

Figure 18:
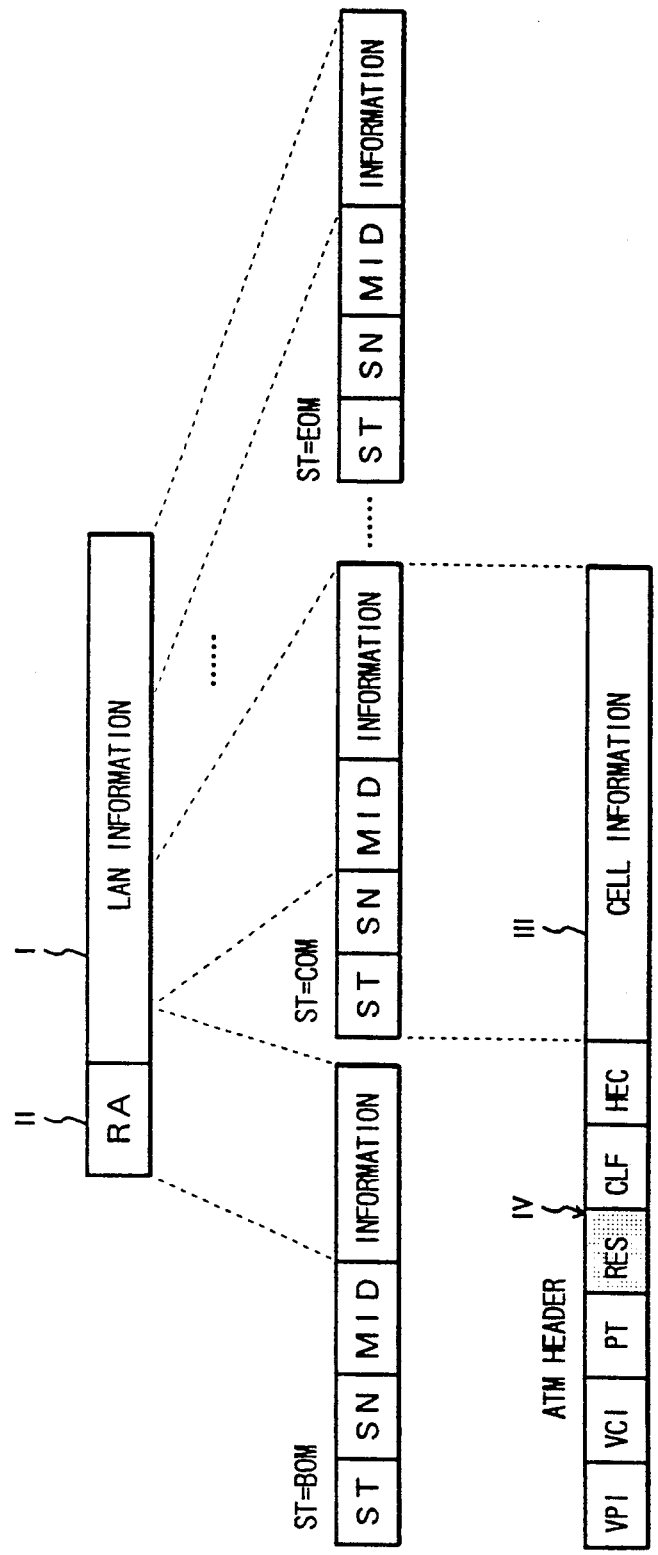
FIG. 18 is a diagram of a transfer format of message used in the second embodiment of the present invention.

FIG. 18 is a diagram showing a transfer format of a message used in the second embodiment of the present invention. As has been described previously with reference to FIG. 11, a message from the CL type terminals includes message information (LAN information) I and routing address (RA) II added to the message information I. The information pieces I and II form the CL type data unit. As has also been described, the CL type data unit is segmented into a plurality of ATM cells, each ATM cell including cell information III and the ATM header IV. The cell information III includes the segment type ST, the sequence number SN, the message identifier MID and segmented information. The cell information has a fixed data length. The ATM header IV includes the virtual path identifier field VPI, the virtual channel identifier field VCI, a payload type field PT, a reserve field RES, a cell loss priority field CLP and a header error control field HEC. The above format is the case in the first embodiment of the present invention. According to the second embodiment of the present invention, the reserve field RES of the ATM header is used in order to control congestion, as will be described in detail later.

Figure 19:
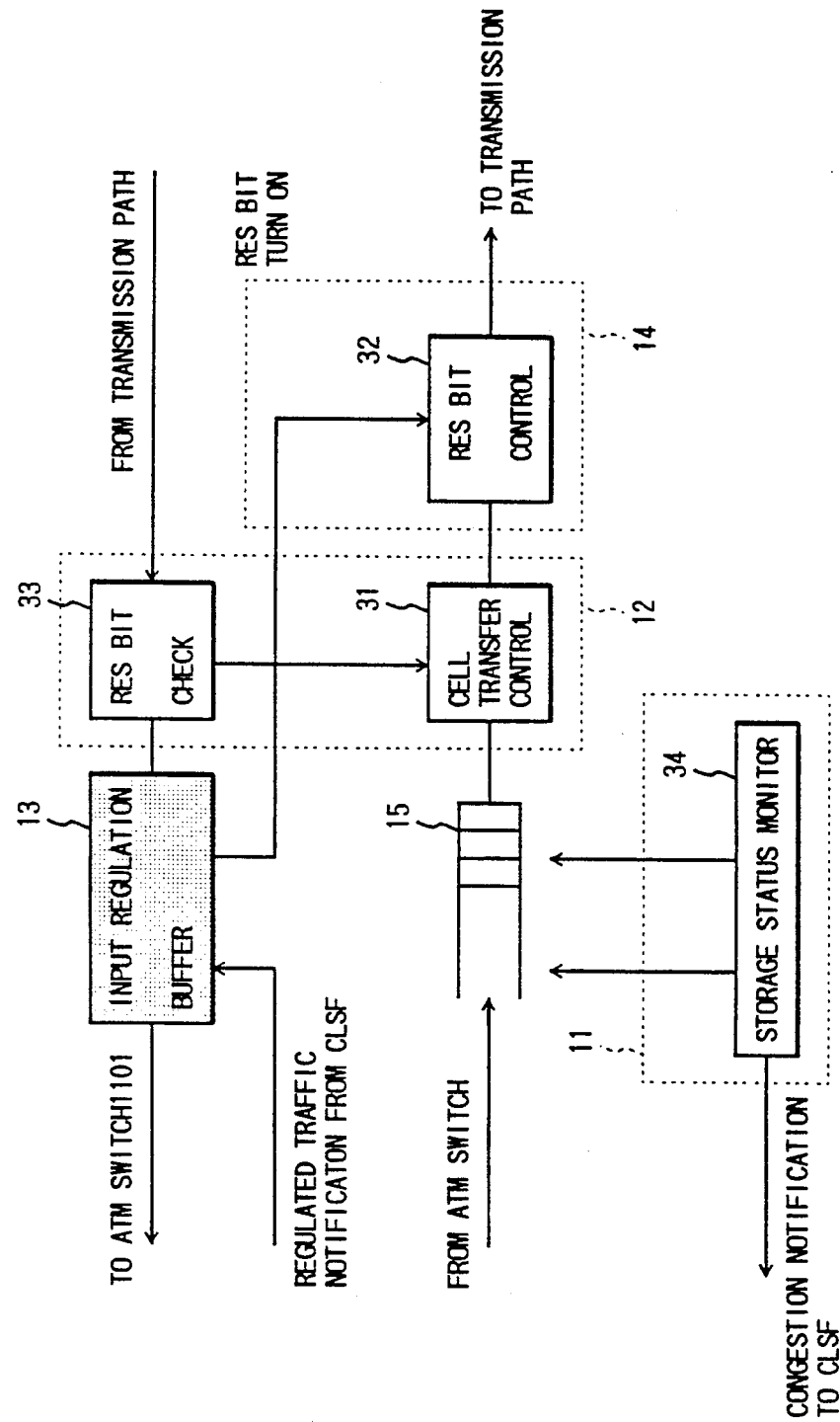
FIG. 19 is a block diagram of a transmission path accommodation unit used in the second embodiment of the present invention.

FIG. 19 is a block diagram of each of the transmission path accommodation units 1103 shown in FIG. 17. In FIG. 19, those parts which are the same as those shown in FIG. 17 are given the same reference numerals. The congestion detection unit 11 includes a storage status monitor circuit 34 which is the same as the storage status monitor circuit 1005 shown in FIG. 15. The cell transmission control unit 12 comprises a cell transfer control circuit 31 and a reserve (RES) bit check circuit 33. The transfer regulation notification unit 14 comprises a reserve bit control circuit 32.

Cells transferred from the CLSF unit 1108 via the ATM switch 1101 are sequentially written into the transmission buffer 15 of the transmission path accommodation unit 1103 and temporarily stored therein. Each cell sequentially read from the transmission buffer 15 passes through the cell transfer control circuit 31 and the reserve bit control 32, and is then transmitted to the transmission path. The reserve bit control circuit 32 turns OFF a reserve (RES) bit in the reserve field RES in the ATM header shown in FIG. 18 in accordance with the transfer regulation information from the input regulation buffer unit 13 when the quantity of data stored in the input regulation buffer 13 becomes close to an overflow level.

The reserve bit check circuit 33 in the sender unit 1103S of the transmission path accommodation unit 1103 monitors the reserve bit in the ATM header of each cell received. When it is determined that the reserve bit is ON, the reserve bit check circuit 33 instructs the cell transfer control circuit 33 to stop transferring the ATM cells to the congested switching node.

The storage status monitor circuit 34 included in the congestion detection unit 11 monitors the quantity of data stored in the transmission buffer 15 in accordance with the difference between a read pointer and a write pointer of the transmission buffer 15. When the quantity of data in store has become greater than a first congestion threshold value, the storage status monitor circuit 34 informs the CLSF unit 1108 that transmission path has been congested via the corresponding storage information notification bus 1101 (FIG. 16). In this case, the signal level on the bus 1101 is switched from "0" to "1". When the quantity of data in store has become smaller than or equal to a second congestion threshold value, the storage status monitor circuit 34 informs the CLSF unit 1108 that the transmission path has returned to the normal state from the congested state via the corresponding storage information notification bus 1101. In this case, the signal level on the bus is switched from "1" to "0". The first and second congestion threshold values may be respectively identical to or different from the first and second threshold values used in the first embodiment of the present invention.

Figure 20:
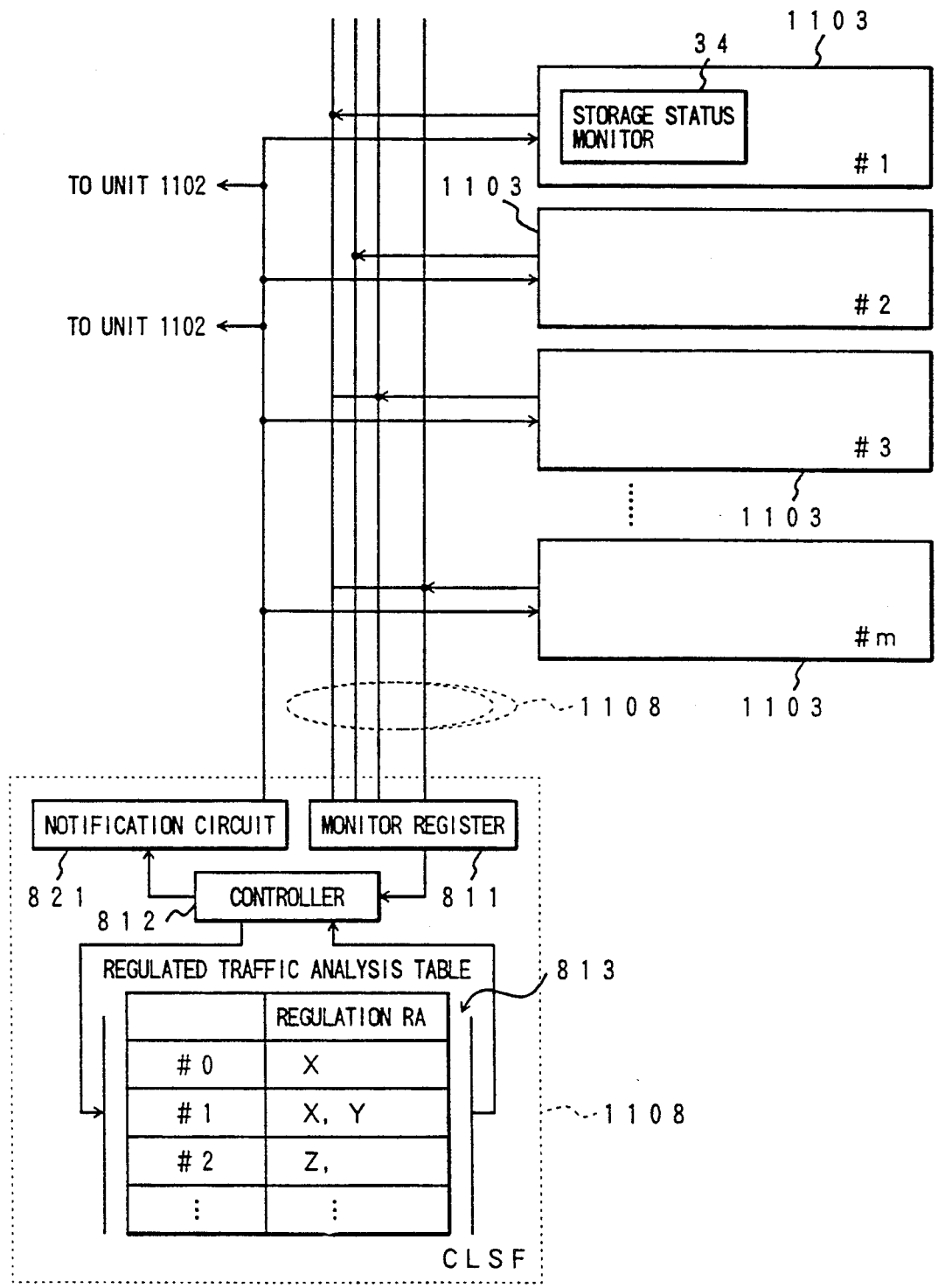
FIG. 20 is a block diagram of a connectionless type service function unit used in the second embodiment of the present invention.

FIG. 20 is a block diagram of the CLSF unit 1108 and its peripheral configuration. In FIG. 20, those parts which are the same as those shown in the previously described figures are given the same reference numerals. The CLSF unit 1108 comprises a monitor register 811, a controller 812, a regulated traffic analysis table 813, and a controller 812. The regulated traffic analysis table 813 is a table formed in a RAM (Random Access Memory), and registers a relation between the number of each transmission path and traffic (regulated routing address RA) causing a congestion in each transmission path in accordance with topology of the network.

The transmission path accommodation units 1103 are respectively connected to the storage information control notification buses 1101, which are connected to the monitor register 811. That is, n storage information notification buses 1101 are provided for n transmission path accommodation units 1103 where n is an integer. The monitor register 811 stores data showing the signal levels of the storage information notification buses 1101. When data showing the signal level of one of the buses 1101 is "1", the corresponding transmission path accommodation unit 1103 has congested. In this case, the controller 812 detects a change in data from "0" to "1", and refers to the regulated traffic analysis table 813. For example, when data relating to the transmission path accommodation unit 1103 having #2 is "1", the controller 812 refers to the table 813 and obtains data showing that routing address Z should be regulated. The routing address(es) to be regulated is transferred to the input regulation buffers 13 and 21 via the notification circuit 821 under the control of the controller 812.

Figure 21:
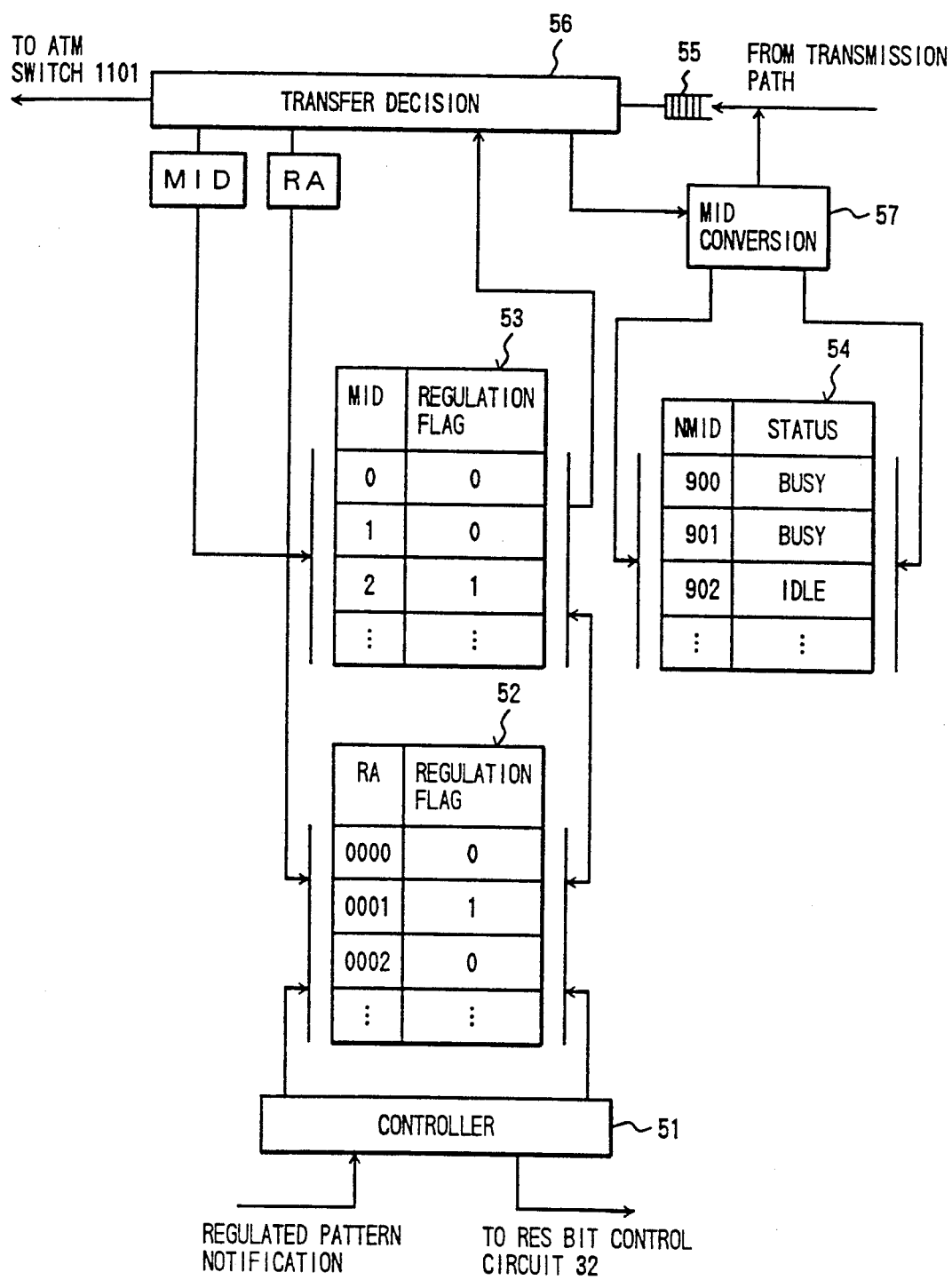
FIG. 21 is a block diagram of an input regulation buffer used in the second embodiment of the present invention.

FIG. 21 is a block diagram of each of the input regulation buffers 13 and 21. Each of the input regulation buffers 13 and 21 comprises a controller 51, a regulation pattern table 52, a message identifier table 53, a message identifier table 54 for use in regulation, a reception buffer 55, a transfer decision circuit 56 and a message identifier circuit 57.

In response to receipt of an input regulation pattern notification (showing the routing address(es) from the CLSF unit 1108, the controller 51 accesses the regulation pattern table 52. As shown in FIG. 21, the regulation pattern table 52, which is formed in the RAM, defines the relation between the routing address and a regulation flag. The message identifier table 53, which is formed in the RAM, defines the relation between the message identifier and the regulation flag. The message identifier table 54 for use in regulation, which is formed in the RAM, defines a relation between a newly assigned message identifier (new message identifier) NMID and status information showing whether or not each new message identifier NMID is idle.

The ATM cells are temporarily stored in the reception buffer 55, and sequentially supplied to the transfer decision circuit 56. The transfer decision circuit 56 checks the segment type ST shown in the ATM header of the ATM cell received from the reception buffer 55. When the input cell is the BOM cell (the first cell), the transfer decision circuit 56 detects the routing address RA contained therein, and searches the regulation pattern table 52 using the detected routing address RA.

When the regulation flag obtained by searching the regulation pattern table 52 shows "0", the transfer decision circuit 56 transfers the beginning-of-message (BOM) cell to the ATM switch 1101 (FIG. 17). When the regulation flag obtained by searching the regulation pattern table 52 shows "1", the transfer decision circuit 56 transfers the ATM cell being considered to the message identifier conversion circuit 57. The ATM cell read from the message identifier conversion circuit 57 is written into the reception buffer 55 again. In this manner, the ATM cell is fed back to the reception buffer 55 when the regulation flag shows "1". Further, the relation between the message identifier contained in the BOM cell and the value of the regulation flag searched for is registered in the message identifier table 53.

When the received ATM cell is the continuation-of-message (COM) cell or the end-of-message (EOM) message, the controller 51 checks the message identifier table 53 on the basis of the message identifier contained in the received ATM cell. When the regulation flag corresponding to the message identifier shows "0", the controller 51 controls the transfer decision circuit 56 to output the ATM cell being considered to the ATM switch 1101. When the regulation flag corresponding to the message identifier shows "1", the controller 51 controls the transfer decision circuit to output the ATM cell to the message identifier conversion circuit 57. In this manner, all the ATM cells originated from one CL type message are equally processed.

The message identifier conversion circuit 57 and the message identifier table 54 for use in transfer regulation are provided for preventing the message identifier of the transfer-regulated ATM cells from being equal to the message identifier of subsequent ATM cells.

Figure 22A:
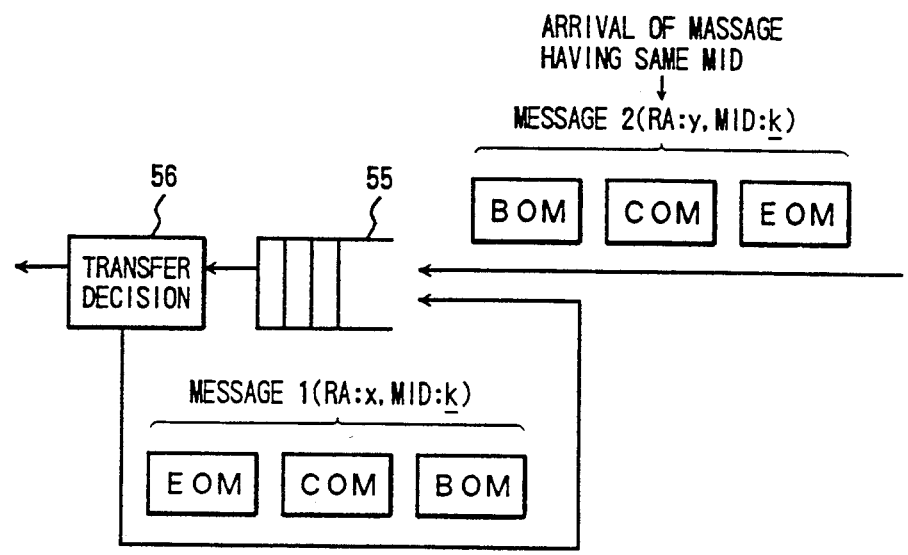
FIGS. 22A and 22B are block diagrams showing how the configuration shown in FIG. 21 operates.

The above will further be described with reference to FIGS. 22A and 22B. As shown in FIG. 22A, if the input regulation buffer does not have the message conversion circuit 57 and the message identifier table 54 for use in transfer regulation, the ATM cells derived from a first message (its routing address RX is x, and the message identifier MID is k) that are directly fed back to the reception buffer 55 will be mixed, in the reception buffer 55, with ATM cells of a second message which is received after the first message and has the same message identifier as the first message. In this case, it is impossible to discriminate the ATM cells derived from the first message from the ATM cells derived from the second message.

Figure 22B:
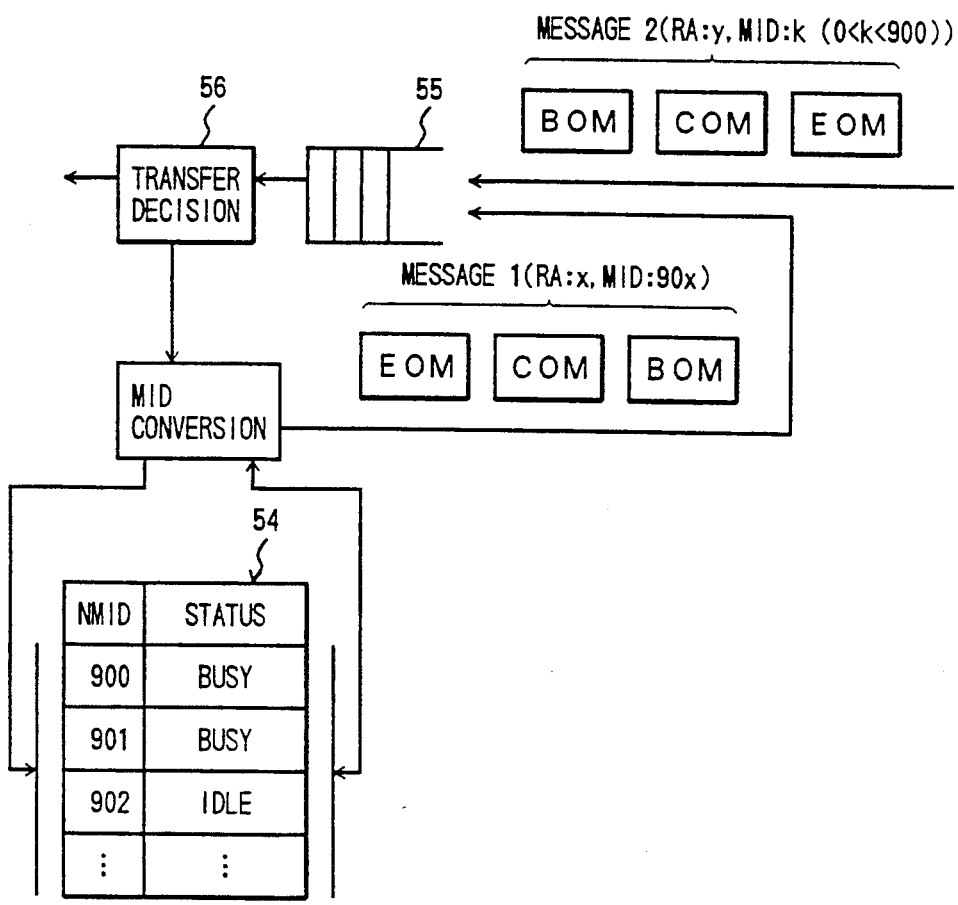

As shown in FIG. 22B, the use of the message conversion circuit 57 and the message identifier table 54 can avoid the above-mentioned problem. In FIG. 22B, identifiers "900"–"1024" are assigned regulated traffic. The message identifier conversion circuit 57 replaces the message identifier of each ATM cell having the routing address x by one of the unused message identifiers among the message identifiers "900"–"1024". At this time, flag data showing the corresponding new message identifier is busy is written into the message identifier table 54 for use in transfer regulation. In this manner, it becomes possible to prevent subsequent ATM cells having the same message identifier k as the regulated ATM cells from being mixed with the subsequent ATM cells.

Returning now to FIG. 21, the controller 51 monitors the quantity of data stored in the reception buffer 55, in other words, the number of ATM cells in store. When the quantity of data in the reception buffer 55 has become close to an overflow level, the controller 51 outputs the transfer regulation information to the reserve bit control circuit 32.

In the above-mentioned manner, the inputting of congestion causing traffic input to the transmission path accommodation units 1103 can be regulated. The regulation process is performed by using the reserve bit in the ATM header. This means that there is no specific means for controlling protocol and notifying the CLSF units of necessary information. As a result, the regulation process can be efficiently performed at high speed. In addition, each of the input regulation buffers 13 or 21 is formed with a single reception buffer, and the ATM cells can be easily regulated by means of the transfer decision circuit 56, the message identifier conversion circuit 57 and the regulation pattern table 52. Hence, the traffic control can be made by the simple hardware configuration.

The process executed when each transmission path accommodation unit 1103 is released from the congested state will be apparent from the above description.

The present invention is not limited to the specifically disclosed embodiments, and variations and modifications may be made without departing from the scope of the present invention.

What is claimed is:

1. A switching node in a label multiplexing type switching network, comprising:

switch means for selectively coupling input logical communication paths and output logical communication parts with each other, m permanent logical communication paths being included in said input logical communication paths where m is an integer larger than or equal to 1, n permanent logical communication paths being included in said output logical communication paths where n is an integer larger than or equal to 1;

call control means, coupled to said switching means, for receiving connection-oriented type information through any of the input logical communication paths and for controlling said switch means so that the connection-oriented type information are selectively transferred to said output logical communication paths via the switch means on the basis of routing address information related to the connection-oriented type information;

routing means, coupled to said switch means, for receiving connectionless type information through any of the m permanent logical communication paths and for controlling said switch means so that the connectionless type information are selectively transferred to the n permanent logical communication paths via the switch means on the basis of routing address information related to the connectionless type information; and a plurality of ports which connect said switch means to a plurality of transmission media provided in the label multiplexing type switching network, wherein:

each of the output logical communication paths is formed on one of the transmission media, and each of said ports comprises:

first buffer means, coupled to said switch means and said one of the transmission media, for storing the connection-oriented type information from said switch means;

second buffer means, coupled to said switch means and said one of the transmission media, for storing the connectionless type information from said switch means; and transfer control means, coupled to said first and second buffer means and said one of the transmission media, for transferring either the connection-oriented type information in said first buffer means or the connectionless type information in said second buffer means on the basis of a quantity of information stored in at least one of said first and second buffer means.

2. A switching node as claimed in claim 1, wherein:

the connectionless type information is a cell which is one of a group of cells obtained by segmenting a message to be transferred;

the connectionless type information contains segment type information showing a position of the connectionless type information in the group of cells, and message identifier information identifying said message, and wherein said routing means comprises control means for controlling said switch means so that the connectionless type information is transferred to one of the transmission media on the basis of routing address information related thereto when the connectionless type information is a first cell which is located at a beginning of the message and for controlling said switch means so that the connectionless type information is transferred to one of the transmission media on the basis of the message identifier when the connectionless type information is one of the group of the cells other than said first cell, so that each of the group of the cells other than the first cell is transferred to one of the transmission media to which the first cell is also transferred.

3. A switching node as claimed in claim 2, wherein said routing means comprises:

first table means for storing a first relation between the routing address information and addresses of said ports; and second table means for storing a second relation between the message identifier information and the addresses of the ports, and wherein said control means comprises means for searching for the address of one of the ports relating to the routing address information contained in said first cell and for searching for the address of one of the ports relating to the message identifier information contained in each of the group of the cells other than the first cell.

4. The switching node as claimed in claim 1, wherein said transfer control means transfers said connectionless type information in said second buffer when there is no connection-oriented type information in said first buffer.

5. A switching node in a label multiplexing type switching network, comprising:

switch means for selectively coupling input logical communication paths and output logical communication paths being included in said input logical communication paths where m is an integer larger than or equal to 1, n permanent logical communication paths being included in said output logical communication paths where n is an integer larger than or equal to 1;

call control means, coupled to said switching means, for receiving connection-oriented type information through any of the input logical communication paths and for controlling said switch means so that the connection-oriented type information are selectively transferred to said output logical communication paths via the switch means on the basis of routing address information related to the connection-oriented type information; and routing means, coupled to said switch means, for receiving connectionless type information through any of the m permanent logical communication paths and for controlling said switch means so that the connectionless type information are selectively transferred to the n permanent logical communication paths via the switch means on the basis of routing address information related to the connectionless type information, wherein:

the connectionless type information is a cell which is one of a group of cells obtained by segmenting a message to be transferred, the connectionless type information contains segment type information showing a position of the connectionless type information in the group of cells, message identifier information identifying said message, and sequence number information sequentially assigned to the group of cells, and said routing means comprises:

first means for detecting a lost cell by referring to said sequence number information; and second means, coupled to said first means, for abandoning a subsequent cell which is the connectionless type information and has the same message identifier information as the lost cell.

6. A switching node as claimed in claim 5, wherein said first means comprises means for determining, for each message, whether or not the sequence number information is sequentially changed each time the connectionless type information is received.

7. A switching node in a label multiplexing type switching network, comprising:

switch means for selectively coupling input logical communication paths and output logical communication paths with each other, m permanent logical communication paths being included in said input logical communication paths where m is an integer larger than or equal to 1, n permanent logical communication paths being included in said output logical paths where n is an integer larger than or equal to 1;

call control means, coupled to said switching means, for receiving connection-oriented type information through any of the input logical communication paths and for controlling said switch means so that the connection-oriented type information are selectively transferred to said output logical communication paths via the switch means on the basis of routing address information related to the connection-oriented type information;

routing means, coupled to said switch means, for receiving connectionless type information through any of the m permanent logical communication paths and for controlling said switch means so that the connectionless type information are selectively transferred to the n permanent logical communication paths via the switch means on the basis of routing address information related to the connectionless type information; and a plurality of ports which connect said switch means to a plurality of transmission media provided in the label multiplexing type switching network, wherein:

each of the output logical communication paths is formed on one of the transmission media, said routing means comprises control means for monitoring traffic of each of the transmission media and for selecting one of the transmission media on the basis of the traffic of each of the transmission media, the connectionless type information being transferred to one of the n logical communication paths formed on said one of the transmission media selected by said control means, and each of said ports comprises:
      first buffer means, coupled to said switch means and said one of the transmission media, for storing the connection-oriented type information from said switch means;
      second buffer means, coupled to said switch means and said one of the transmission media, for storing the connectionless type information from said switch means; and
      transfer control means, coupled to said first and second buffer means and said one of the transmission media, for transferring either the connection-oriented type information in said first buffer means or the connectionless type information in said second buffer means on the basis of a quantity of information stored in at least one of said first and second buffer means.

8. A switching node in a label multiplexing type switching network, comprising:

switch means for selectively coupling input logical communication paths and output logical communication paths with each other, m permanent logical communication path being included in said input logical communication paths where m is an integer larger than or equal to 1, n permanent logical communication paths being included in said output logical communication paths where n is an integer larger than or equal to 1;

call control means, coupled to said switching means, for receiving connection-oriented type information through any of the input logical communication paths and for controlling said switch means so that the connection-oriented type information are selectively transferred to said output logical communication paths via the switch means on the basis of routing address information related to the connection-oriented type information;

routing means, coupled to said switch means, for receiving connectionless type information through any of the m permanent logical communication paths and for controlling said switch means so that the connectionless type information are selectively transferred to the n permanent logical communication paths via the switch means on the basis of routing address information related to the connectionless type information; and a plurality of ports which connect said switch means to a plurality of transmission media provided in the label multiplexing type switching network, wherein:

each of the output logical communication paths is formed on one of the transmission media, and each of said ports comprises:

first buffer means, coupled to said switch means and said one of the transmission media, for storing the connection-oriented type information from said switch means;

second buffer means, coupled to said switch means and said one of the transmission media, for storing the connectionless type information from said switch means; and transfer control means, coupled to said first and second buffer means and said one of the transmission media, for transferring either the connection-oriented type information in said first buffer means or the connectionless type information in said second buffer means on the basis of a quantity of information stored in at least one of said first and second buffer means, wherein:

said transfer control means of each of the ports comprises monitor means for comparing the quantity of the connectionless type information stored in said second buffer means with first and second threshold values where the second threshold value is greater than the first threshold value, and said routing means comprises means for executing a regulated routing control in which the connectionless type information is inhibited from being transferred to one of the ports in which the second buffer means stores the connectionless type information having a quantity grater than said second threshold value and for canceling said regulated routing control when the quantity of the connectionless type information has become smaller than said first threshold value.

9. A switching node as claimed in claim 8, wherein:

said routing means comprises register means for storing flag information showing comparison results obtained by said monitor means respectively provided in the ports; and said switching node comprises a plurality of buses connecting said monitor means respectively provided in the ports and said register means to each other.

10. A switching node in a label multiplexing type switching network, comprising:

switch means for selectively coupling input logical communication paths and output logical communication paths with each other, m permanent logical communication paths being included in said input logical communication paths where m is an integer larger than or equal to 1, n permanent logical communication paths being included in said output logical communication paths where n is an integer larger than or equal to 1;

call control means, coupled to said switching means, for receiving connection-oriented type information through any of the input logical communication paths and for controlling said switch means so that the connection-oriented type information are selectively transferred to said output logical communication paths via the switch means on the basis of routing address information related to the connection-oriented type information;

routing means, coupled to said switch means, for receiving connectionless type information through any of the m permanent logical communication paths and for controlling said switch means so that the connectionless type information are selectively transferred to the n permanent logical communication paths via the switch means on the basis of routing address information related to the connectionless type information; and a plurality of ports which connect said switch means to a plurality of transmission media provided in the label multiplexing type switching network, wherein:

each of the output logical communication paths is formed on one of the transmission media, and each of said ports comprises:

first buffer means, coupled to said switch means and said one of the transmission media, for storing the connection-oriented type information from said switch means;

second buffer means, coupled to said switch means and said one of the transmission media, for storing the connectionless type information from said switch means; and transfer control means, coupled to said first and second buffer means and said one of the transmission media, for transferring either the connection-oriented type information in said first buffer means or the connectionless type information in said second buffer means on the basis of a quantity of information stored in at least one of said first and second buffer means, wherein:

said transfer control means of each of the ports comprises monitor means for comparing the quantity of the connection-less type information stored in said second buffer means with first and second threshold values where the second threshold value is greater than the first threshold value, and said call control means comprises means for inhibiting said call control means for executing a call process when the quantity of the connectionless type information stored in the second buffer means is greater than said second threshold value and for canceling inhibition of said call process when the quantity of the connectionless type information has become smaller than said first threshold value.

11. A switching node as claimed in claim 10, wherein:

said call control means comprises register means for storing flag information showing comparison results obtained by said monitor means respectively provided in the ports; and said switching node comprises a plurality of buses connecting said monitor means respectively provided in the ports and said register means to each other.

12. A switching node in a label multiplexing type switching network, comprising:

switch means for selectively coupling input logical communication paths and output logical communication paths with each other, m permanent logical communication paths being included in said input logical communication paths where m is an integer larger than or equal to 1, n permanent logical communication paths being included in said output logical communication paths where n is an integer larger than or equal to 1;

call control means, coupled to said switching means, for receiving connection-oriented type information through any of the input logical communication paths and for controlling said switch means so that the connection-oriented type information are selectively transferred to said output logical communication paths via the switch means on the basis of routing address information related to the connection-oriented type information;

routing means, coupled to said switch means, for receiving connectionless type information through any of the m permanent logical communication paths and for controlling said switch means so that the connectionless type information are selectively transferred to the n permanent logical communication paths via the switch means on the basis of routing address information related to the connectionless type information; and a plurality of ports which connect said switch means to a plurality of transmission media provided in the label multiplexing type switching network, wherein:

each of the output logical communication paths is formed on one of the transmission media, and each of said ports comprises:

first buffer means, coupled to said switch means and said one of the transmission media, for storing the connection-oriented type information from said switch means;

second buffer means, coupled to said switch means and said one of the transmission media, for storing the connectionless type information from said switch means; and transfer control means, coupled to said first and second buffer means and said one of the transmission media, for transferring either the connection-oriented type information in said first buffer means or the connectionless type information in said second buffer means on the basis of a quantity of information stored in at least one of said first and second buffer means, wherein:

said transfer control means of each of the ports comprises monitor means for comparing the quantity of the connectionless type information stored in said second buffer means with first and second threshold values where the second threshold value is greater than the first threshold value, said routing means comprises means for executing a regulated routing control in which the connectionless type information is inhibited from being transferred to one of the ports in which the second buffer means stores the connectionless type information having a quantity greater than said second threshold value and for canceling said regulated routing control when the quantity of the connectionless type information has become smaller than said first threshold value, and said call control means comprises means for inhibiting said call control means from executing a call process when the quantity of the connectionless type information stored in the second buffer means is greater than said second threshold value and for canceling inhibition of said call process when the quantity of the connectionless type information has become smaller than said first threshold value.

13. A switching node as claimed in claim 12, wherein:

said routing means comprises first register means for storing flag information showing comparison results obtained by said monitor means respectively provided in the ports;

said call control means comprises second register means for storing the flag information showing comparison results obtained by said monitor means respectively provided in the ports; and said switching node comprises a plurality of buses connecting said monitor means respectively provided in the ports and said first register means connected to said second register means.

14. A switching node in a label multiplexing type switching network, comprising:

switch means for selectively coupling input logical communication paths and output logical communication paths with each other, m permanent logical communication paths being included in said input logical communication paths where m is an integer larger than or equal to 1, n permanent logical communication paths being included in said output logical communication paths where n is an integer larger than or equal to 1;

call control means, coupled to said switching means, for receiving connection-oriented type information through any of the input logical communication paths and for controlling said switch means so that the connection-oriented type information are selectively transferred to said output logical communication paths via the switch means on the basis of routing address information related to the connection-oriented type information;

routing means, coupled to said switch means, for receiving connectionless type information through any of the m permanent logical communication paths and for controlling said switch means so that the connectionless type information are selectively transferred to the n permanent logical communication paths via the switch means on the basis of routing address information related to the connectionless type information; and a plurality of ports which connect said switch means to a plurality of transmission media provided in the label multiplexing type switching network, wherein:

each of the output logical communication paths is formed on one of the transmission media, each of said ports comprises:

first buffer means, coupled to said switch means and said one of the transmission media, for storing the connection-oriented type information from said switch means;

second buffer means, coupled to said switch means and said one of the transmission media, for storing the connectionless type information from said switch means;

transfer control means, coupled to said first and second buffer means and said one of the transmission media, for transferring either of the connection-oriented type information in said first buffer means for the connectionless type information in said second buffer means on the basis of a quantity of information stored in at least one of said first and second buffer means;

input regulation buffer means, coupled to said switch means and said one of the transmission media, for storing information transferred via one of the transmission media; and monitor means, coupled to said second buffer means, for detecting a predetermined storage status in which a transfer congestion is about to take plate in said one of the transmission media, and said routing means comprise regulation control means, coupled to said input regulation buffer means and said monitor means, for controlling said input regulation buffer means so that cells relating to said traffic congestion are inhibited from being input to said switch means.

15. A switching node as claimed in claim 14, wherein each of said ports comprises feedback means for feeding back the cells related to said traffic congestion to said input regulation buffer means.

16. A switching node in a label multiplexing type switching network, comprising:

switch means for selectively coupling input logical communication paths and output logical communication paths with each other, m permanent logical communication paths being included in said input logical communication paths where m is an integer larger than or equal to 1, n permanent logical communication paths being included in said output logical communication paths where n is an integer larger than or equal to 1;

call control means, coupled to said switching means, for receiving connection-oriented type information through any of the input logical communication paths and for controlling said switch means so that the connection-oriented type information are selectively transferred to said output logical communication paths via the switch means on the basis of routing address information related to the connection-oriented type information;

routing means, coupled to said switch means, for receiving connectionless type information through any of the m permanent logical communication paths and for controlling said switch means so that the connectionless type information are selectively transferred to the n permanent logical communication paths via the switch means on the basis of routing address information related to the connectionless type information; and a plurality of ports which connect said switch means to a plurality of transmission media provided in the label multiplexing type switching network wherein:

each of the output logical communication paths is formed on one of the transmission media, each of said ports comprises:

first buffer mean, coupled to said switch means and said one of the transmission media, for storing the connection-oriented type information from said switch means;

second buffer means, coupled to said switch means and said one of the transmission media, for storing the connectionless type information from said switch means;

transfer control means, coupled to said first and second buffer means and said one of the transmission media, for transferring either of the connection-oriented type information in said first buffer means or the connectionless type information in said second buffer means on the basis of a quantity of information stored in at least one of said first and second buffer means;

input regulation buffer means, coupled to said switch means and said one of the transmission media, for storing information transferred via one of the transmission media; and monitor means, coupled to said second buffer means, for detecting a predetermined storage status in which a traffic congestion is about to take place in said one for the transmission media, and said routing means comprises regulation control means, coupled to said input regulation buffer means and said monitor means, for controlling said input regulation buffer means so that cells relating to said traffic congestion are inhibited from being input to said switch means, wherein:

said regulation control means comprises table means for storing regulating routing address information for each of the transmission media, and said regulation control means comprises means for controlling, by referring to said table means, said input regulation buffer means so that cells relating to the regulated routing address information concerning said one of the transmission media in which said traffic congestion is about to take place are inhibited from being input to said switch means.

17. A switching node in a label multiplexing type switching network, comprising:

switch means for selectively coupling input logical communication paths and output logical communication paths each other, m permanent logical communication paths being included in said input logical communication paths where m is an integer larger than or equal to 1, n permanent logical communication paths being included in said output logical communication paths where n is an integer larger than or equal to 1;

call control means, coupled to said switching means, for receiving connection-oriented type information through any of the input logical communication paths and for controlling said switch means so that the connection-oriented type information are selectively transferred to said output logical communication paths via the switch means on the basis of routing address information related to the connection-oriented type information;

routing means, coupled to said switch means, for receiving connectionless type information through any of the m permanent logical communication paths and for controlling said switch means so that the connectionless type information are selectively transferred to the n permanent logical communication paths via the switch means on the basis of routing address information related to the connectionless type information; and a plurality of ports which connect said switch means to a plurality of transmission media provided in the label multiplexing type switching network wherein;

each of the output logical communication paths is formed on one of the transmission media, each of said ports comprises:

first buffer mean, coupled to said switch means and said one of the transmission media, for storing the connection-oriented type information from said switch means;

second buffer means, coupled to said switch means and said one of the transmission media, for storing the connectionless type information from said switch means;

transfer control means, coupled to said first and second buffer means and said one of the transmission media, for transferring either of the connection-oriented type information in said first buffer means or the connectionless type information in said second buffer means on the basis of a quantity of information stored in at least one of said first and second buffer means;

input regulation buffer means, coupled to said switch means and said one of the transmission media, for storing information transferred via one of the transmission media; and monitor means coupled to said second buffer means, for detecting a predetermined storage status in which a traffic congestion is about to take place in said one for the transmission media, and said routing means comprises regulation control means, coupled to said input regulation buffer means and said monitor means, for controlling said input regulation buffer means so that cells relating to said traffic congestion are inhibited from being input to said switch means, wherein:

each of said ports comprises decision means, coupled to said input regulation buffer means, for allowing cells which are the connectionless type information and which do not relate to said cell congestion to be input to said switch means from said input regulation buffer means.

18. A switching node is a label multiplexing type switching network, comprising:

switch means for selectively coupling input logical communication paths and output logical communication paths with each other, m permanent logical communication paths being included in said input logical communication paths where m is an integer larger than or equal to 1, n permanent logical communication paths being included in said output logical communication paths where n is an integer larger than or equal to 1;

call control means, coupled to said switching means, for receiving connection-oriented type information through any of the input logical communication paths and for controlling said switch means so that the connection-oriented type information are selectively transferred to said output logical communication paths via the switch means on the basis of routing address information related to the connection-oriented type information;

routing means, coupled to said switch means, for receiving connectionless type information through any of the m permanent logical communication paths and for controlling said switch means so that the connectionless type information are selectively transferred to the n permanent logical communication paths via the switch means on the basis of routing address information related to the connectionless type information, and a plurality of ports which connect said switch means to a plurality of transmission media provided in the label multiplexing type switching network, wherein:

each of the output logical communication paths is formed on one of the transmission media, each of said ports comprises:

first buffer mean, coupled to said switch means and said one of the transmission media, for storing the connection-oriented type information from said switch means;

second buffer means, coupled to said switch means and said one of the transmission media, for storing the connectionless type information from said switch means;

transfer control means, coupled to said first and second buffer means and said one of the transmission media, for transferring either of the connection-oriented type information in said first buffer means or the connectionless type information in said second buffer means on the basis of a quantity of information stored in at least one of said first and second buffer means;

input regulation buffer means, coupled to said switch means and said one of the transmission media, for storing information transferred via one of the transmission media; and monitor means, coupled to said second buffer means, for detecting a predetermined storage status in which a traffic congestion is about to take place in said one for the transmission media, and said routing means comprises regulation control means, coupled to said input regulation buffer means and said monitor means, for controlling said input regulation buffer means so that cells relating to said traffic congestion are inhibited from being input to said switch means, wherein each of said ports further comprises feedback means for feeding back the cells relating to said traffic congestion to said input regulation buffer means, wherein said feedback means of each of said ports comprises conversion means for converting the message identifier information contained in each of the cells to be fed back into new message identifier information in order to distinguish the cells fed back from cells applied to said switch means.

19. A switching node in a label multiplexing type switching network, comprising:

switch means for selectively coupling input logical communication paths and output logical communication paths with each other, m permanent logical communication paths being included in said input logical communication paths where m is an integer larger than or equal to 1, n permanent logical communication paths being included in said output logical communication paths where n is an integer larger than or equal to 1;

call control means, coupled to said switching means, for receiving connection-oriented type information through any of the input logical communication paths and for controlling said switch means so that the connection-oriented type information are selectively transferred to said output logical communication paths via the switch means on the basis of routing address information related to the connection-oriented type information;

routing means, coupled to said switch means, for receiving connectionless type information through any of them permanent logical communication paths and for controlling said switch means so that the connectionless type information are selectively transferred to the n permanent logical communication paths via the switch means on the basis of routing address information related to the connectionless type information; and a plurality of ports which connect said switch means to a plurality of transmission media provided in the label multiplexing type switching network, wherein:

each of the output logical communication paths is formed on one of the transmission media, each of said ports comprises:

first buffer mean, coupled to said switch means and said one of the transmission media, for storing the connection-oriented type information from said switch means;

second buffer means, coupled to said switch means and said one of the transmission media, for storing the connectionless type information from said switch means;

transfer control means, coupled to said first and second buffer means and said one of the transmission media, for transferring either of the connection-oriented type information in said first buffer means or the connectionless type information in said second buffer means on the basis of a quantity of information stored in at least one of said first and second buffer means;

input regulation buffer means, coupled to said switch means and said one of the transmission media, for storing information transferred via one of the transmission media; and monitor means, coupled to said second buffer means, for detecting a predetermined storage status in which a traffic congestion is about to take place in said one for the transmission media, and said routing means comprises regulation control means, coupled to said input regulation buffer means and said monitor means, for controlling said input regulation buffer means so that cells relating to said traffic congestion are inhibited from being input to said switch means, wherein each of said ports comprises means, coupled to said second buffer means, for turning ON a congestion notification bit contained, as a reservice bit, in the connectionless type information read from said second buffer means when said input regulation buffer means is about to overflow.

20. A switching node as claimed in claim 19, wherein each of said ports comprises:

check means for detecting a state where the congestion notification bit contained in each cell received is ON: and means, coupled to said check means and said second buffer means, for stopping outputting the connectionless type information in said second buffer means to one of the transmission media.

21. A switching node in a label multiplexing type switching network, said switching node comprising:

switch means for selectively coupling input logical communications paths and output logical communications paths with each other, m permanent logical communications paths being included in said input logical communications paths where m is an integer larger than or equal to 1, n permanent logical communications paths being included in said output logical communications paths where n is an integer larger than or equal to 1;

call control means, coupled to said switching means, for receiving connection-oriented type information through any of the input logical communications paths and for controlling said switch means so that the connection-oriented type information are selectively transferred to said output logical communications paths via the switch means on the basis of routing address information related to the connection-oriented type information;

routing means, coupled to said switch means, for receiving connectionless type information through any of the m permanent logical communications paths and for controlling said switch means so that the connectionless type information are selectively transferred to the n permanent logical communications paths via the switch means on the basis of routing address information related to the connectionless type information; and ports which connect said switch means to a plurality of transmission media provided in the label multiplexing type switching network, each of the output logical communications paths being formed on one of the transmission media, and wherein said routing means comprises control means for monitoring traffic of each of the transmission media and for selecting one of the transmission media on the basis of the traffic of each of the transmission media, the connectionless type information being transferred to one of the n logical communications paths formed on said one of the transmission media selected by said control means.

* * * * *

UNITED STATES PATENT AND TRADEMARK OFFICE
CERTIFICATE OF CORRECTION

PATENT NO. : 5,287,535
DATED : February 15, 1994
INVENTOR(S) : KAZUO SAKAGAWA et al.

It is certified that error appears in the above-identified patent and that said Letters Patent is hereby corrected as shown below:

Column 4, line 6, after "in" insert --which:-- and line 22, after "the" insert --present--.

Column 7, line 57, after "value" insert --,--.

Column 8, line 34, after "VCI" delete "-" and substitute --=--.

Column 17, line 8, delete "15".

Column 23, line 3, delete "parts" and substitute --paths--.

Column 24, line 32, after "paths" insert --with each other, m permanent logical communication paths--.

Column 26, line 69, delete "grater" and substitute --greater--.

Column 30, line 37, delete "transfer" and substitute --traffic--; and line 38, delete "plate" and substitute --place--.

UNITED STATES PATENT AND TRADEMARK OFFICE
CERTIFICATE OF CORRECTION

PATENT NO. : 5,287,535

DATED : February 15, 1994

INVENTOR(S) : KAZUO SAKAGAWA et al

It is certified that error appears in the above-indentified patent and that said Letters Patent is hereby corrected as shown below:

Column 34, line 32, delete "them" and substitute --the m--.

Signed and Sealed this

Second Day of August, 1994

*Attest:*

BRUCE LEHMAN

*Attesting Officer*     Commissioner of Patents and Trademarks